US011978461B1

(12) United States Patent
Radzishevsky

(10) Patent No.: US 11,978,461 B1
(45) Date of Patent: May 7, 2024

(54) TRANSIENT AUDIO WATERMARKS RESISTANT TO REVERBERATION EFFECTS

(71) Applicant: Alex Radzishevsky, Haifa (IL)

(72) Inventor: Alex Radzishevsky, Haifa (IL)

(73) Assignee: Alex Radzishevsky, Haifa (IL)

( * ) Notice: Subject to any disclaimer, the term of this patent is extended or adjusted under 35 U.S.C. 154(b) by 411 days.

(21) Appl. No.: 17/520,739

(22) Filed: Nov. 8, 2021

Related U.S. Application Data

(60) Provisional application No. 63/237,156, filed on Aug. 26, 2021.

(51) Int. Cl.
*G10L 19/018* (2013.01)
*G10L 19/00* (2013.01)
*G10L 21/038* (2013.01)

(52) U.S. Cl.
CPC .................................. *G10L 19/018* (2013.01)

(58) Field of Classification Search
CPC ..... G10L 19/018; G10L 19/00; G10L 21/038; G10L 19/167; H04S 1/007
See application file for complete search history.

(56) References Cited

U.S. PATENT DOCUMENTS 6,219,634 B1 * 4/2001 Levine .................. G10L 18/018 704/200.1
7,644,274 B1 2/2010 Graumann
8,300,820 B2 10/2012 Rhein
8,369,972 B2 2/2013 Topchy et al.
9,311,924 B1 4/2016 Blesser
9,978,382 B2 5/2018 Jimenez
10,043,527 B1 * 8/2018 Gurijala ................ G10L 19/025
10,580,421 B2 3/2020 Topchy et al.
2004/0024588 A1 * 2/2004 Watson ................... G10L 19/00 704/200.1

FOREIGN PATENT DOCUMENTS

CA 2900406 C 8/2014
WO 2011160966 A1 12/2011

* cited by examiner

*Primary Examiner* — Leonard Saint-Cyr
*Assistant Examiner* — Ethan Daniel Kim

(57) ABSTRACT

An encoding and decoding method for digital audio watermarking and data hiding in transient acoustic content is disclosed. The audio signal is segmented into overlapping frames and each frame is decomposed into frequency bands. A special transient detector is used to detect frames characterized by transient audio signals (rapidly rising signal amplitude envelope and a relatively broadband spectrum with rapidly evolving spectral content, such as speech fricatives, drum beats, etc.). Frames falling on or containing transients are detected and encoded with binary watermark data by unconditionally hard-modulating the signal frequency band signals according to rules determined by the value of the respective associated binary data bits of the watermark data and without reference to the characteristics of the watermarked band signals. The method is undetectable by human listeners and unusually resistant to the degrading effects of acoustic reverberation.

16 Claims, 12 Drawing Sheets

TRANSIENT AUDIO WATERMARKS RESISTANT TO REVERBERATION EFFECTS

CROSS REFERENCE TO RELATED APPLICATIONS

This application claims the priority benefit of U.S. provisional application 63/237,156, "AUDIO WATERMARK EMBEDDING AND EXTRACTION", filed Aug. 26, 2021; the entire contents of which are incorporated herein by reference.

BACKGROUND OF THE INVENTION

Field of the Invention

The invention is in the field of electronic detection of copied audio and audiovisual media, in particular acoustic watermarking technology.

Description of the Related Art

Watermarking is a signal processing approach and family of digital signal processing algorithms that allow secret digital signatures to be imperceptibly and inaudibly embedded (hidden) in acoustic content so that this data cannot be removed without affecting the original audio quality. The embedded inaudible information can be retrieved and used for various purposes, such as verifying authenticity or identity, identifying the author or recipient of content, triggering events, etc.

Recent developments in digital audio and video technology have raised issues related to copyright protection and monitoring the distribution of digital copies of audio content. There are also so-called "second screen" applications that require reliable and imperceptible digital data transmission via acoustic sound waves for event triggering, identification and synchronization. Digital audio watermarking allows a secret digital signature to be embedded (hidden) in audio content so that this data cannot be removed without affecting the original audio quality. The embedded information can be retrieved and used to verify the authenticity of the audio content, establish the identity of the owner or recipient, or serve as an event trigger. In general, the embedded watermark should be imperceptible and inaudible to consumers of the audio content.

The watermark should also be undetectable by non-owners and resistant enough to be reliably extracted from the audio content even after the audio has been transformed by operations such as transcoding, over-the-air transmission, editing, cropping, frequency response equalization, etc.

To date, various approaches and techniques for watermarking have been developed. The vast majority of existing techniques are weak modulation techniques that introduce only slight changes to the signal content in the time or spectral domain.

Jimenez (Jimenez, D. M: Method and apparatus for embedding and extracting watermark data in an audio signal. U.S. Pat. No. 9,978,382, 2013) describes a frequency domain modulation method in which codification of binary encoded watermark is done by measuring and then altering magnitudes of FFT coefficients. In order to make the alteration unnoticeable to the listener, the coefficient values used for codification are made proportional to the mean magnitude of the replaced coefficient magnitudes. A special "beacon" signal, representing a peak at a pre-defined frequency, is artificially added into the source signal as a synchronization mean to indicate the starting point of the watermark to the receiving side. Additionally, a special synchronization pattern is periodically codified in the coefficients to indicate the position of the watermark carrier coefficients. The watermark data detection is done by detecting the beacon signal, indicating the starting point, and the synchronization pattern, indicating the location of coefficients; the data extraction is done by comparing sums of coefficient groups to pre-defined coefficient values.

Rhein (Rhein, H.: Method of embedding a digital watermark in a useful signal. U.S. Pat. No. 8,300,820, 2006) proposes watermarking technique exploiting another weak modulation encoding idea. In Rhein's method, the 0's and the 1's of the binary encoded watermark are encoded by measuring and then adjusting spectral component magnitudes of the audio signal with respect to each other. More specifically, a pair of spectral components is used to codify a single bit of data, wherein the codification is done by measuring and then adjusting magnitudes of the frequency components so that their ratio satisfies a certain pre-defined threshold and wherein the frequency components are chosen within a narrow bandwidth below 200 Hz. The method uses at least one synchronization and at least one identifier bit sequence. The corresponding watermark detection method calculates the ratios of the magnitudes in corresponding pairs of frequency components to extract binary data.

Blesser (Blesser, B.: Spectral wells for inserting watermarks in audio signals. U.S. Pat. No. 9,311,924, 2015) proposes a method in which the watermark data codification is done by adding a watermark signal into so-called "spectral wells" of the carrier audio signal, wherein the spectral well comprises an existing or an artificially created (using band-stop filtering and amplitude alterations) "dip" in the audio signal spectrum. Blesser's method involves measuring magnitudes of spectral components and applying corresponding gains to attenuate or amplify specific spectral components as a function of the measured magnitude values of the watermarked audio signal to create a spectral well and satisfy certain amplitude rules related to the codified signal value. More specifically, the method utilizes exactly 3 spectral or temporal portions of the signal to codify a single watermark symbol, wherein values of the two utmost portions are used to form the spectral well, and a value of the third (middle) portion is used to codify the watermark symbol value by averaging the two utmost portions. For the best results, the method suggests utilizing psycho-acoustic modeling to hide the spectral magnitude changes introduced by the encoder.

Courtney et al (Courtney, G. H., Hammond, R. J., Mcaliley, J. H.: Encoding and decoding an audio watermark, Canadian patent 2,900,406, 2014) proposes a spread-spectrum modulation method in which data encoding is done by multiplying the source audio signal spectrum components by a vector consisting of randomly generated weights and having an equal number of positive and negative values, wherein all the values have the same absolute value. Watermark detection and extraction are performed by repeating the same multiplication process to obtain a recovered signal, averaging the frequency components to which the weight vector was applied and further determining the encoded data based on averaging the resulting amplitude and thresholding the result to obtain binary data values.

Graumann (Graumann, D. L.: Enhanced acoustic transmission system and method. U.S. Pat. No. 7,664,274, 2000) proposes a watermarking method based on psycho-acoustic modeling and auditory masking. The method uses a specific masking signal (e.g., a narrow-band random stationary noise signal) to mask a watermark carrier signal, such as an adjacent pure-tone signal. The method includes a system for generating a masked encoded signal within an enhanced acoustic transmission signal, and a band-rejection mean for removing frequency bands surrounding the carrier frequency from the source audio signal. In Graumann's method, the modulated carrier signal, the masking signal, and the audio signal are combined to form the enhanced acoustic transmission signal.

Topchy (Topchy, A. P., Ramaswamy, A., Srinivasan, V.: Methods and apparatus to perform audio watermarking and watermark detection and extraction. U.S. Pat. No. 10,580, 421, 2018) describes a watermarking process in which the encoding of the binary encoded watermark is accomplished by emphasizing selected spectral frequencies of the carrier signal relative to the other frequencies, a process which involves an artificial synthesis of frequency components used to represent watermark data. Topchy's method relies, in part, on the fact that the selection of frequencies is based on psycho-acoustic modeling to determine the least audible frequencies best suited to conceal the added data.

Wang et al (Wang, J., Healy, R., Timoney, Audio watermarking. International patent application WO 2011/160966, 2011) describes a watermarking method for audio signals, in which the encoding of a single bit of data using at least two frequency components and at least two overlapping signal frames is performed by repeatedly adjusting the component magnitudes to satisfy certain mutual criteria, wherein the adjustment decisions being made based on the Complex Spectral Phase Evolution (CSPE) analysis method.

Topchy (Topchy, A. P., Ramaswamy, A., Srinivasan, V.: Methods and apparatus to perform audio watermarking and watermark detection and extraction. U.S. Pat. No. 8,369, 972, 2008) describes an audio watermarking method in which the encoding of data is accomplished by combining artificially synthesized frequency components carrying the watermarked data with the spectrum of the source audio signal in specific frequency regions that should be selected by a special psycho-acoustic masking evaluator to produce inaudible watermarks.

BRIEF SUMMARY OF THE INVENTION

The methods described above, as well as many others not listed here, provide sufficient tools to watermark audio signals for various applications, and are robust to moderate audio transformations and distortions introduced by DA/AD conversion, lossy audio coding (e.g., MP3), retransmission, etc. The methods listed, while technically universal, can generally only be used with weak modulation when applied to watermarked audio signals in the frequency range audible to humans. Using these techniques with "hard" modulation/amplification results in significant distortion of the perceived audio quality. On the other hand, the use of weak modulation leads to limited robustness of the generated watermarks. In particular, none of these techniques is able to efficiently handle the use cases of over-the-air audio transmission and reception, especially in acoustic environments with strong reverberation, such as reverberant halls. Spectrum "blurring" caused by acoustic reverberation destroys all information embedded by weak modulation techniques since the reverberant, long "tails" of the signal's high-energy peaks completely obscure any spectral detail generated by the weak modulation to carry the watermark data.

The invention is based, in part, on the insight that in order to address this problem, other special approaches are required.

The watermarking method disclosed herein does not involve spread spectrum techniques, random or pseudorandom noise mixing, artificial signal generation, psychoacoustic modeling (such as time or frequency masking estimation), phase modulation, insertion of synchronization data, or correlation-based decisions, but represents an approach that addresses the phenomenon of reverberation by design.

The invention is based, in part, on the insight that while a number of audio watermarking schemes developed so far provide good robustness to sample rate conversion, transcoding with lossy audio coders (such as using MPEG audio methods), the transducing of watermarked sound over the air, i.e., from loudspeaker to microphone, especially on large distances and in reverberant rooms, often destroys hidden watermark, making the watermark unextractable.

Reverberation is the persistence of sound in acoustic space after the sound has been produced by the sound source (e.g., a loudspeaker). Reverberation occurs when a sound wave is reflected by acoustic obstacles such as room walls, resulting in numerous reflections. The reflected sound waves gradually decay over time as the sound is absorbed by the surfaces of objects in the room. Depending on the size of the room and the absorption characteristics of its objects, reverberation can take a very long time to decay to zero, even after the original sound excitation has ceased. In an empty room or in a room with glass walls, reverberation can last a very long time, much longer than in the same room with non-glass walls, carpets, and furniture. At any given moment, a microphone used to pick up the sound reproduced by the sound source (such as a loudspeaker) picks up a mixture of the direct wave and its delayed and attenuated copies produced by reflections of that wave from various surfaces. Reverberation thus blurs acoustic information in time by mixing the direct sound with its delayed weaker components. This makes digital data transmission over the air using sound in reverberant rooms a major challenge.

The invention is also based, in part, on the insight that for the described reasons, improved methods for watermarking and data hiding for applications requiring high watermark extraction reliability in scenarios with over-the-air sound transmission are desirable.

The present disclosure teaches an invention related to a core signal processing approach to digital audio watermarking and data hiding in acoustic content. More specifically, a method of audio watermarking producing robust and imperceptible watermarks is disclosed. The technique demonstrates high data robustness under the over-the-air transmission, including highly reverberant acoustic environments such as living rooms and large halls. The method allows embedding arbitrary digital data into an audio signal using the given acoustic content as a carrier (e.g., music recording, speech) without introducing noticeable audio quality degradation. The described method does not imply adding any additional audible components into the carrier acoustic content while embedding digital data in it. Instead, it modifies the existing acoustic content in the audible frequency range by hard-modulating its frequency response, specifically by rejecting (nulling) or at least significantly attenuating specific frequencies under certain conditions described hereinafter and for very short periods of time.

A corresponding method for detecting and extracting watermarks from the acoustic content is also disclosed. The technique features easy synchronization at the decoding stage, very high robustness against acoustic reverberation, involves a minimum of calculations enabling very fast and extremely low-computation encoding and decoding, is applicable to single- and multi-channel audio, and does not degrade the perceptual audio quality.

The watermarking technique disclosed herein exploits the physical properties of acoustic reverberation and some known human auditory system properties to effectively fight the impact of the reverberation on the transmission of data via acoustic signals in the audible frequency range. More specifically, the concept of the presently disclosed technique is based on two central ideas:

- reverberation "blurs" the acoustic information in time due to the mixing of direct sound with its delayed and weaker components; therefore, only sharp signal fronts (e.g., attack and peak of a drum beat, vocal non-sibilant fricative) have the greatest chance of preserving their original spectral structure in the time-frequency domain of sound recording captured in a reverberant environment;
- time and frequency masking, familiar from psychoacoustics, makes any acoustic content modifications occurring in relatively narrow bands of an essentially wide-band signal with rapidly increasing energy imperceptible to the human brain, especially if they are of short duration.

Embossment on Signal Transients

Based on the two aforementioned central ideas, data embedding in the disclosed technique is performed on signal transients, i.e., on signal intervals where the energy raises substantially, and the spectrum evolves quickly in the entire frequency bandwidth of the signal or at least in a substantial part of the audible frequency range. This fundamental concept of the presently disclosed approach distinguishes it from other existing methods while simultaneously solving several problems and side effects that other watermarking techniques suffer from.

The term "signal transient" or simply "transient" is a short form of a term known in audio signal processing as "signal attack transient". This term has no unique definition but is typically used to describe a short-duration signal interval that represents a non-harmonic and high-energy attack phase of a sound source, or, in other words, a short-duration signal interval (typically <50 ms) that exhibits a rapidly rising energy and a rapid evolution of the short-time spectrum of the sound signal. The FIG. 1 shows a generalized explanation of the "onset", "attack", "decay" and "transient" phases of a sound signal. The watermarking method described hereinafter can just as well be applied to the "attack" signal phase only, or to the entire "transient" signal interval (which includes the attack and peak phases), provided both are characterized by a rapidly rising signal amplitude envelope and a relatively wide-band spectrum. To simplify the present description, both cases will be referred to as "transients" hereinafter.

In nature, there are very few narrow-band signals; most signals have a wide spectrum. Human speech and music are typical examples of dynamically evolving wide-band acoustic content with rapidly changing peaks and dips. Sibilants in speech (e.g., [s] as in "sip," [z] as in "zip," [f] as in "ship"), non-sibilant fricatives ([f] as in "fine," [θ] as in "thing," [v] as in "vine," etc.), and music beats (drums, cymbals) are particular examples of natural signals with a wide spectrum and fast attacks. Thus, if the data is embedded only during transient events, there are still enough occurrences of the encoding events, at least for real, non-stationary sounds.

In an embodiment of a method for watermark embedding, a time-domain audio signal is segmented into frames that usually significantly overlap with each other. Dynamics of the processed signal, i.e., the evolution of the signal content and its spectral energy over time, is continuously monitored by a dedicated transient detection mechanism to detect abrupt increases in signal energy, i.e., frames on which the signal energy significantly increases compared to previous frames. A signal frame in which a significant signal increase is detected is classified as a transient frame. Other frames that do not fall on transients, or where the energy increase is not steep enough, or where the energy decreases compared to the previous frame, are classified as non-transient frames. In other embodiments, spectral flatness or harmonicity is calculated to detect non-harmonic signal intervals in addition to energy estimation.

The encoding of binary encoded watermark occurs only for signal frames that are classified as transient frames, i.e., signal frames that contain or fall on transients. The signal of non-transient frames is not modified and remains intact.

Hard-Modulation of Spectrum

Encoding data in signal transients is done by hard modulation of the signal's frequency response, specifically by rejecting (nulling) or significantly attenuating certain frequency bands. Weak modulation techniques that cause only minor changes to the energies of the frequency components do not guarantee robust detection of watermarks in a signal with strong reverberation because, as explained earlier, reverberation blurs the spectral information in time and makes weak changes in the mixture of direct and reflected/delayed copies of the spectral components undetectable. On the other hand, the instantaneous shape of the frequency spectrum of a transient is largely preserved even in the presence of strong reverberation and noise, since the direct wave during transient is usually stronger than the delayed reflections of older signal components arriving at the same time, ensuring that these delayed reflections do not obscure the transient. Therefore, hard frequency response modulation, such as rejection (nulling) or at least significant attenuation of certain frequency components applied to transient signal intervals, dramatically increases the ability to detect them in the reverberant and noisy signal recording. Interestingly, the ability of the human ear to perceive such hard-modulations during rapid signal attacks and transients, especially for full-band signals such as speech fricatives or drum and cymbal sounds, is extremely limited, so that even drastic and relatively wide-band short-term frequency response changes go almost completely unnoticed by human listeners. This property reinforces the advantage of the presently disclosed technique over weak modulation methods, as it allows for more drastic and thus more robust and better detectable signal changes without going noticed by the listener. Thus, the method described hereinafter achieves at least two watermarking goals simultaneously: robustness and acoustic imperceptibility of the produced watermarks.

FIG. 2 shows the process of hard modulation of transient and non-transient sounds, includes an illustration of the changes that the hard modulated sound undergoes under strong reverberation, and demonstrates preservation of the hard modulated waveform when applied to a transient.

The idea of embedding data by hard modulation of the signal spectrum and the idea of embedding data only in transients are two closely related ideas that, in combination, form an important part of the watermarking technique disclosed in this disclosure and have significant advantages over other existing watermarking methods. The technique disclosed in this disclosure can be briefly referred to as "watermarking by imprinting transients".

Time/Speed Variation

As mentioned hereinabove, even relatively wide-band hard-modulations, e.g., suppression of frequency regions of 250 Hz and even wider, remain unnoticeable if performed for a short time on wide-band transients. This feature not only increases robustness but also helps to withstand signal time/speed variation. Time/speed variation produces a shift in frequencies, representing a major challenge at the decoding stage with techniques operating with frequency components expected at specific pre-defined frequency domain positions. By using wider-band frequency modulations, the decoding becomes much less vulnerable to frequency shifts because the analyzed spectral components still fall within the modulated regions even if they have been shifted. Thus, the ability to use wider-band modulations without noticeable effects helps to withstand frequency shifting without the need for additional special means or extra logic, as is the case with other watermarking methods.

Blind Sync and Extraction

Remarkably, the presently disclosed method also solves the synchronization problem, i.e., the detection of the watermarked sequence in the audio signal. The vast majority of watermarking techniques use special signals, markers, anchors, or landmarks added at the watermark embedding stage to serve as a flag indicating the presence of the hidden watermark in the signal. The presently disclosed technique hereinafter does not require the use of such means and allows for completely "blind" synchronization and extraction of the watermark. Since the frequency components and spectral shape of transients are largely preserved even in the presence of strong reverberation and noise, one can decide whether the frame is watermarked or not by firstly considering only transient frames falling on transients, and secondly analyzing the shape of the candidate transient frame in the frequency domain (frequency response) and checking whether the observed shape has hard modulated dips or not. Ultimately, the presently disclosed method achieves three goals simultaneously: robustness, imperceptibility, and ease of synchronization.

Multi-Channel Audio Encoding

One of the major drawbacks of existing weak modulation watermarking techniques is the transmission of multi-channel data over the air. A microphone that picks up sound over the air receives a mixture of multiple channels. Suppose that weak modulation, particularly energy- or phase-dependent modulation, is used to watermark each of the channels separately. In this case, the mixture of channel signals captured over the air drastically reduces the decoder's ability to detect weak modulations, especially when the audio channels carry significantly different acoustic content, such as in independent stereo recordings. The method described in the present invention applies the hard modulation to all audio channels at identical times and frequencies so that this hard modulation is easily detected even in the mixture of channel signals.

Fast Encoding, Fast Sync, Fast Decoding

Besides the performance advantages of the presently disclosed watermarking algorithm, it is important to mention its computational simplicity both at encoding and decoding stages.

Since the encoding, as detailed hereinafter, does not require any signal measurements except for detection of transients, the encoding can be performed even with extremely resource-constrained microcontrollers. No resource-intensive computations (e.g., psycho-acoustic masking modeling) are required to embed the watermark. The data embedding is done in the transient frames (i.e., frames falling on transients) unconditionally. The encoding can even be done by analog means over analog signal using appropriate band decomposition means.

Decoding is almost as simple as encoding. All that needs to be done is to calculate the energies in specific frequency bands. As detailed hereinafter, no special logic or complicated mathematical calculation is required, neither at the detection (synchronization) nor the extraction stage.

Single-Frame Watermarks

An additional advantage of the disclosed method is that the entire watermark can be embedded in a single frame of the signal (instant embedding) without having to spread it over multiple frames. This facilitates both the detection and extraction of the hidden data. Moreover, and more importantly, the watermark can be detected with high temporal accuracy with respect to the carrier signal timeline. Such instant watermarking may be useful, for example, in applications where the watermarks are used for temporal synchronization, such as the detection of events marked by watermarks in the signal.

Applicability to Compressed Domain

The presently disclosed method can be directly applied to audio signals represented in a compressed domain, such as MP3 (MPEG-1 Layer III) and others, without transcoding. Since the bitstream of many audio codecs contains coefficients of the sound spectrum, which contain all the necessary information about energies and frequencies, the detection of transients as well as the watermarking can be done by rejecting/suppressing frequencies without recompression.

Low-Latency Encoding/Decoding

Eventually, the simplicity of the presently disclosed algorithm, wherein any change to the signal frame is instantaneous and unconditional without dependency on subsequent frames, enables low latency watermarking. Some latency is only required to reliably estimate transient events, which may require storing a short history of frames. However, transient sounds in the real world, such as transients in speech, usually have very short attack times, typically shorter than 50 ms. Therefore, a buffer of 50 ms is usually sufficient for the transient detector to detect a transient and classify the frame as a transient frame or non-transient frame. The transient detection latency is the only latency introduced by the presently disclosed watermarking method and therefore provides low latency watermark encoding, detection and decoding.

DETAILED DESCRIPTION OF THE INVENTION

Figure 1:
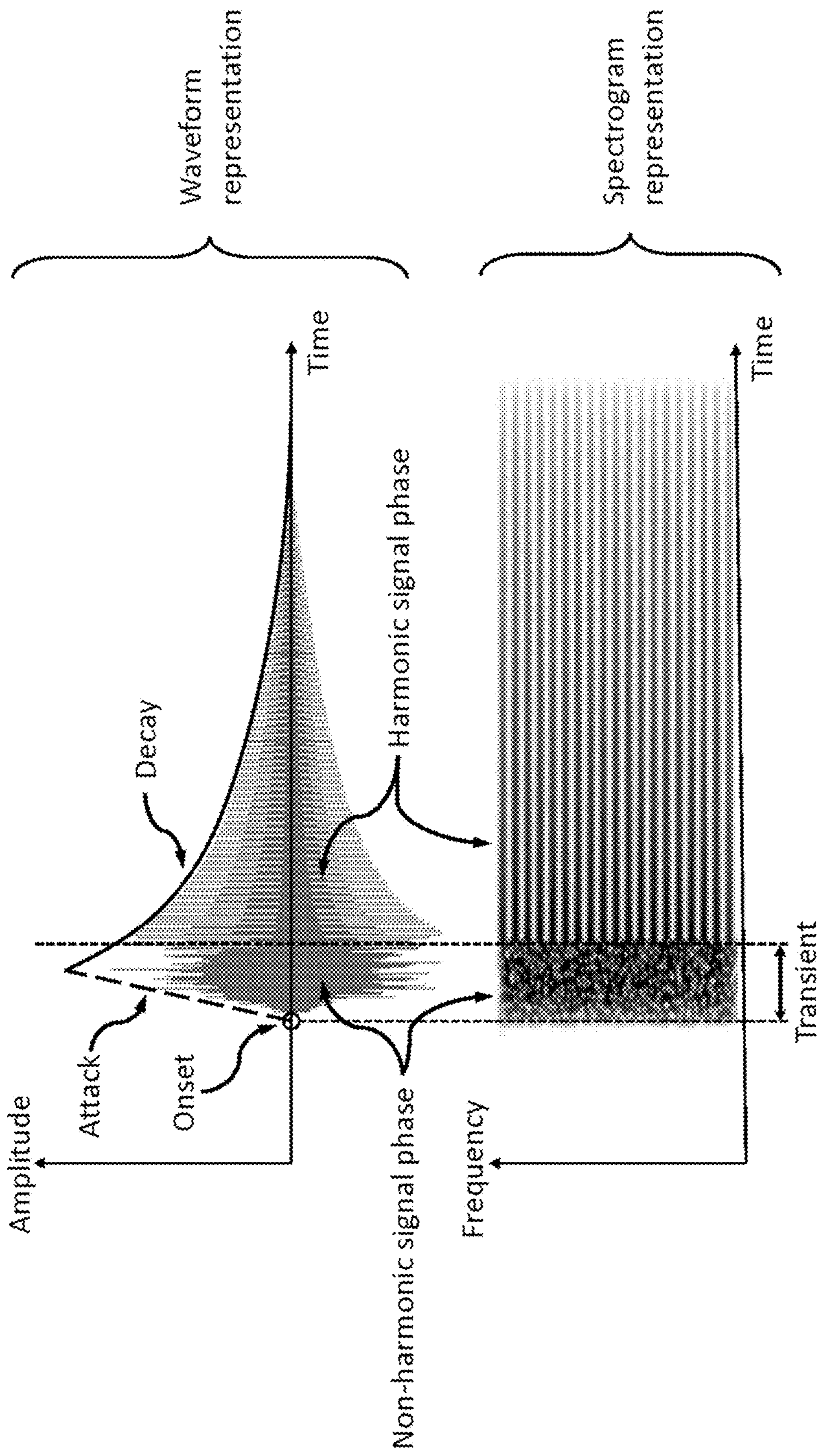
FIG. 1: Example waveform (top) and spectrogram (bottom) of an audio signal showing onset, attack, transient, decay, harmonic and non-harmonic phases of the signal.
Figure 2:
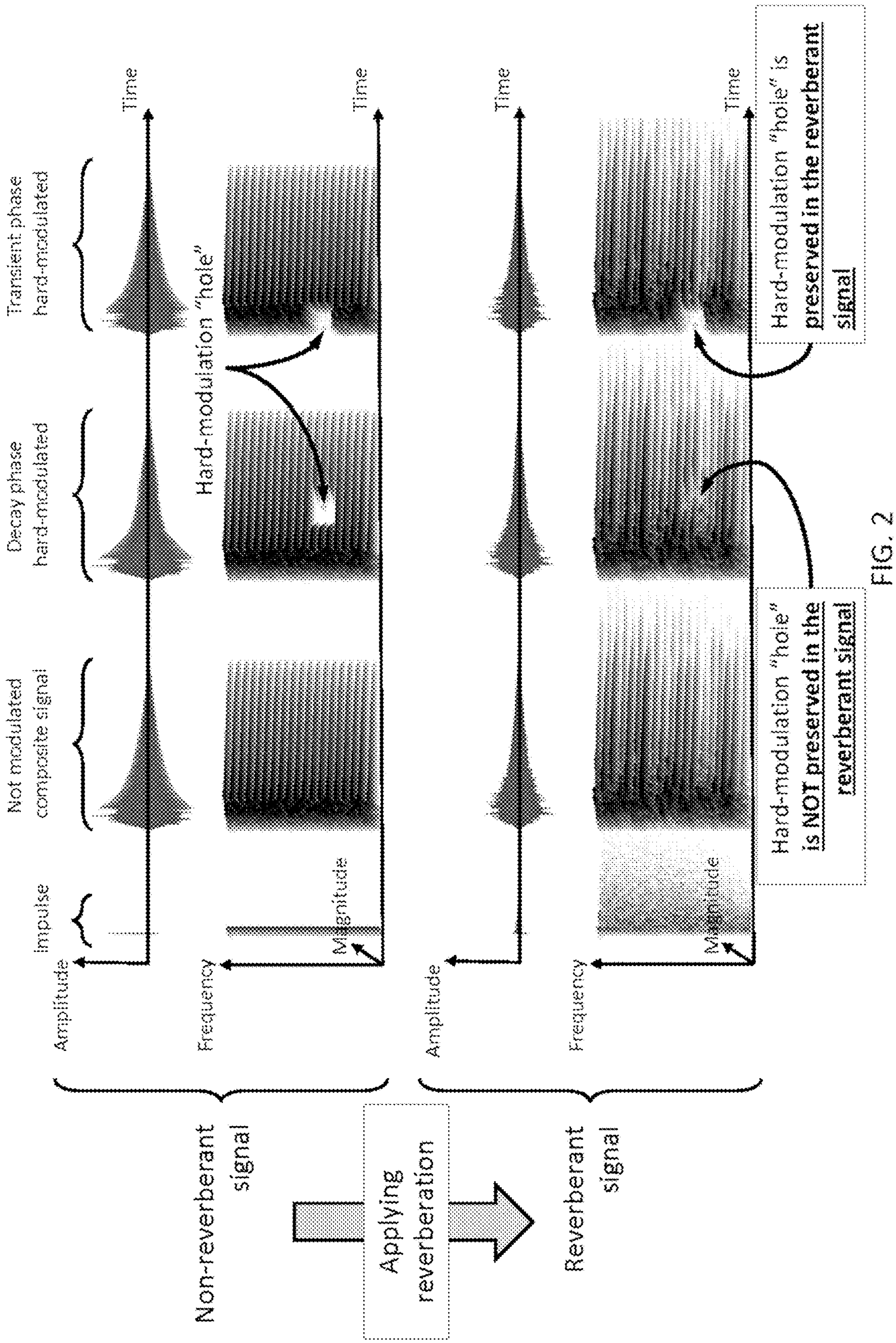
FIG. 2: Top—waveform and 3-dimensional spectrogram of a multi-part signal consisting of a short impulse followed by three identical copies of a composite signal (the signal consists of a transient and a harmonic phase): unmodulated, hard-modulated in the transient phase, and hard-modulated in the harmonic phase; bottom—the same multi-part signal transmitted in the presence of acoustic reverberation, where the hard-modulated spectral "hole" produced in the transient phase of the signal is preserved, and the hard-modulated hole produced in the harmonic phase of the signal is not preserved.

In some embodiments, the invention may be a system or method of encoding or decoding an acoustic watermark into at least some transient audio signals. Because these watermarks are applied to transient audio signals, and generally not to other types of audio signals, the technique is often referred to as a "transient acoustic watermark." Similarly, the present invention is occasionally referred to as a transient acoustic watermark system or method.

Although the invention can be expressed in either a device/system or methods format, here, for ease of reading, we may alternatively designate the invention as a system or a method depending on which phrasing is easier to read.

From a system or device perspective, generally, the invention will be implemented using at least one computer processor, as well as computer memory to at least read and write the various media files (which will often comprise digitized audio files, or audiovisual files, such as video) or media streams. In some embodiments, if direct audio input or output is desired, the system may further comprise various analog to digital (A/D) or digital to analog (D/A) devices, microphones, speakers, and the like. Here, however, we will generally assume that the system is working with previously digitized audio files or streams, or synthetic audio files or streams, and is generally outputting watermarked digital audio files or streams. These, in turn, will usually be converted to audio signals using another device.

Thus, when we speak of "audio signals" in this disclosure, we are generally referring to digitized audio signals rather than analog audio signals. Thus, even when an analog signal is distorted by reverberation, generally, the distorted analog signal will then be digitized and transformed into a digitized distorted analog signal before being processed by the invention.

For the purposes of this invention, the distinction between analog audio and digital audio is essentially insignificant because digital audio signals can be readily transformed to analog signals with suitable decoding and digital to analog converters. Similarly, analog audio signals can be readily transformed into digital audio using suitable analog to digital converters and encoders. Thus, persons of average skill in the art will recognize that the invention is intended to cover both analog and digital audio signals.

In some embodiments, the various methods disclosed herein may be performed on well-known computer processors, which may contain one or more cores from the ARM, x86, MIPS, or another processor family. In other embodiments, the various methods performed herein may be performed by special purpose electronic devices, such as ASIC devices. Thus, in some embodiments, some or all of the various algorithms discussed herein may be implemented by software, while in other embodiments, some or all of the various algorithms may be implemented by specialized electronic hardware specifically configured to perform those specific algorithms. Thus, in this disclosure, it should be assumed that every step and algorithm described herein is generally done entirely automatically, without any human input, using various types of electronic circuitry (often computer processors) and/or software.

At a high level, the invention may be a transient acoustic watermark method. This method will typically comprise encoding this type of watermark, decoding this type of watermark, or both. Here we will discuss encoding the watermark first, and then we will discuss how to read (decode) the watermark. Here, it may be useful to refer to the flow charts in FIGS. 11 and 12. Other figures will also be discussed as relevant.

Figure 4:
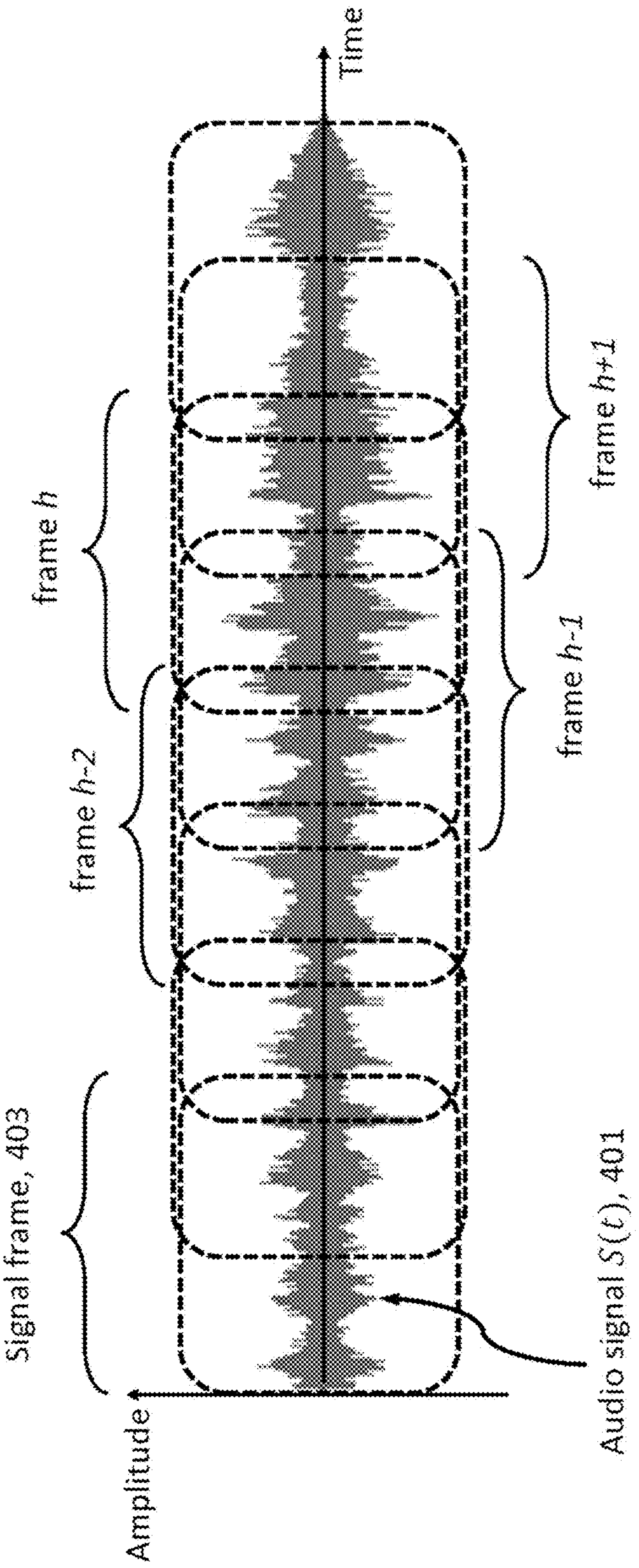
FIG. 4: Segmentation of the input audio time-domain signal into overlapping frames.

Encoding:

From an encoding perspective, the invention may be a method of encoding at least one binary encoded watermark into an audio signal (which we can designate as the input audio signal). Here, one or more computer processors will segment the (input) audio signal into a plurality of time overlapping frames, as shown in FIG. 4. Each frame H (enumerated . . . h−1, h, h+1 . . . ) will have a unique sequential time stamp. That is, the different frames are ordered in time.

About "time overlapping:" In a preferred embodiment, the time overlapping frames will comprise frames of equal time lengths. However, each subsequent frame will partially overlap in time with its proceeding frame. In a preferred embodiment, this overlap will be about 50% of that time length. Other values are possible, however. Thus, more generally, the overlap may be on the order of 80%, 70%, 60%, 50%, 40%, 30%, or 20% of the frame's time length. Additionally, embodiments where the different time frames need not be of equal time lengths are also possible, and are not disclaimed.

The system will then use a transient detector to determine which of these frames are "transient frames" comprising transient audio signals, and which of these frames are "non-transient frames" that don't contain transient signals. See FIG. 1, and FIG. 7 for an example of transient signals and transient frames.

Transient signals and transient detectors are discussed in more detail later in this disclosure.

Briefly, however, transient frames typically comprise frames characterized by at least one of an abrupt increase of time-domain signal amplitude envelope, or an abrupt increase of signal spectral energy, or an abrupt increase of zero-crossing rate, or an abrupt increase of spectral flatness, or an abrupt decrease of harmonicity.

Often, the transient detector will determine what frames are transient frames by measuring and tracking, on both a given frame and its preceding frame, at least one of: time-domain amplitude envelope values, spectral-domain signal energy values, zero-crossing rate values, spectral flatness values, or harmonicity values. This allows the detector to produce tracked values. The detector can use these tracked values to determine if a frame is a transient or non-transient frame by monitoring when changes in a given tracked value, over at least the time difference between said given frame and its preceding frame, exceeds a preset criterion.

Detecting transient frames is important because, as previously discussed, and as will be discussed further in more detail, according to the invention, transient audio signals and transient audio frames are a particularly good place to "hide" watermarks.

In order to embed watermarks into at least some of these transient audio frames, the system will further decompose at least some of the various transient frames into a plurality of frequency bands. This can be seen in more detail in FIG. 6, FIG. 9 and subsequent discussion.

The system will typically encode at least one binary encoded watermark into at least one transient frame by hard-modulating the signal magnitudes of the variety of frequency bands according to at least one binary encoded watermark. This produces at least one watermarked transient frame.

About "hard-modulating": As discussed previously, many prior art watermarking methods also use various types of "modulation" of phase or amplitude. However, typical prior art watermarking methods, in addition to modulating different (non-transient) parts of the signal, also typically modulate differently. Most prior art methods employ "slight modulation", often alternatively referred to as "weak modulation", to avoid having the watermark modulation become audible to the listener.

By contrast, one advantage to the present invention's technique of only applying watermark modulation to the transient signals is that this is much less likely to be audible to the listener. This enables the use of "hard" modulation, which may have a gain of 20 dB and more (factor 0.1 and lower). This isn't usually audible because it is buried in the transient audio, and thus not discernable by the human user.

Figure 9:
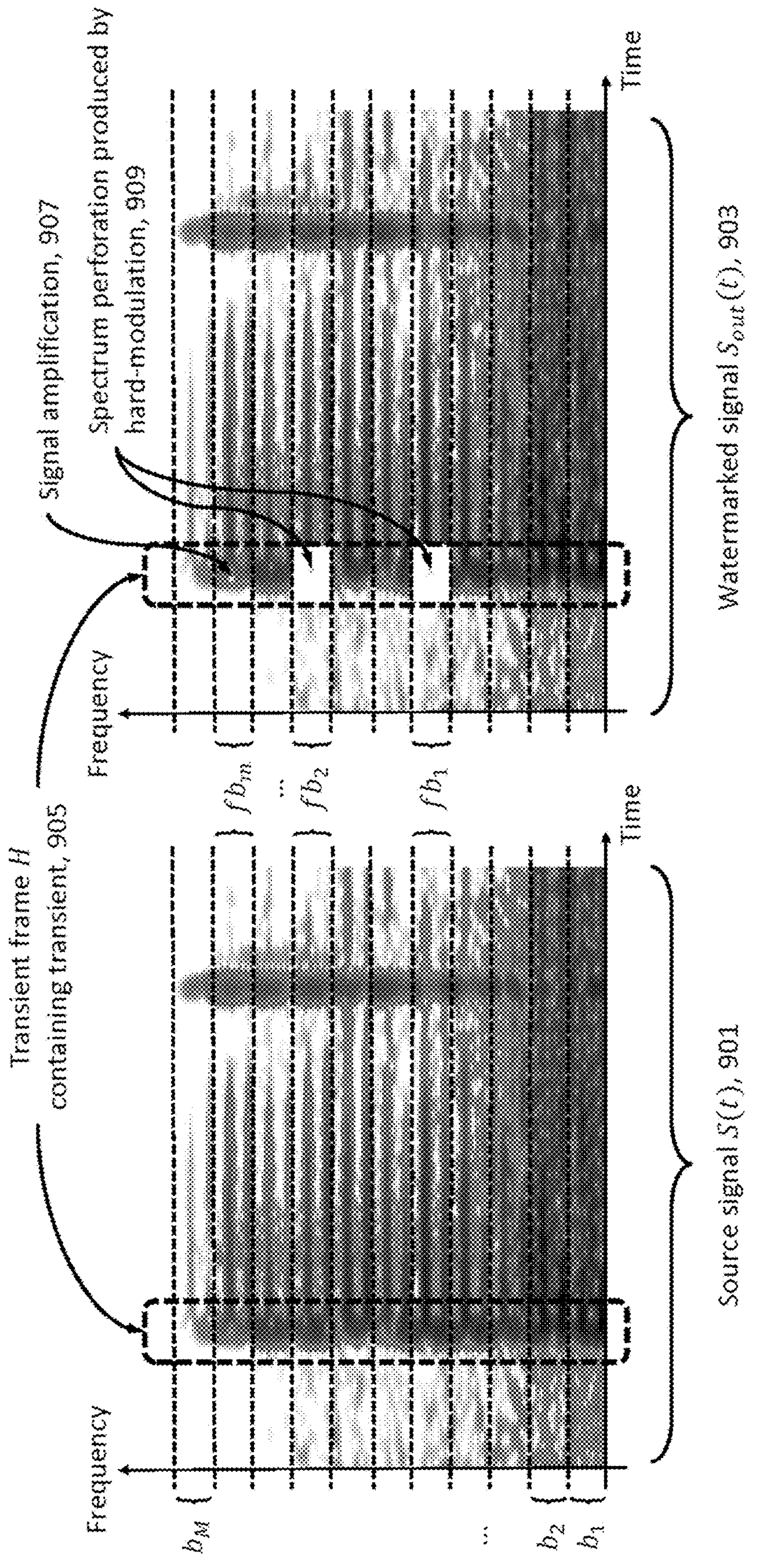
FIG. 9: Left: Spectrogram of an input signal with transient frame falling on a transient; Right: Output (watermarked) signal with "holes" produced in the spectrum by hard-modulating the signal in frequency bands of the frame.

A before and after figure of this can be seen by comparing FIG. 9 (left side, before watermarking) to FIG. 9 (right side after watermarking). That particular transient frame H is clearly watermarked, as can be seen in spectrum analysis, with certain frequency bands being almost totally knocked out by the hard-modulation process. However, this will be difficult or impossible for a human listener to detect.

Thus, in some embodiments, as previously discussed, the system will encode at least one binary encoded watermark into at least one transient frame by hard-modulating the signal magnitudes of the plurality of frequency bands according to at least one binary encoded watermark, thereby creating at least one watermarked transient frame.

This modulation can be done by various methods. In one embodiment, the system will typically select, using at least one processor, a plurality of bit positions in a binary encoded watermark to produce a "bit cluster".

The system can then define a character, representing a set of bit values of the bits at positions comprising the bit cluster, and produce a character cluster representing a set of characters in which each character represents a specific set of bit values of bits of the bit cluster. Thus, there is a character for each possible set of bit values of the bits comprising the bit cluster. The system can also select a subset of bands from the various frequency bands to produce a frequency band cluster and map the bits in the bit cluster into the various frequency bands in the frequency cluster. Note that this band cluster will typically comprise at least n+1 bands, where n is the number of bits in the corresponding bit cluster.

More specifically, the system may, for example, define a hard-modulation gain pattern representing a set of hard-modulation gain values for those bands comprising a given frequency band cluster, and produce a gain pattern cluster representing a set of the hard-modulation gain patterns. Here, each hard-modulation gain pattern can be used to represent a specific set of hard-modulation gain values of bands of the band cluster. Thus, the system can perform the mapping by associating each unique character from the character cluster with a unique hard-modulation gain pattern from the gain pattern cluster.

The system can then determine those characters of the character cluster, which correspond to those bit values contained at corresponding bit positions of the binary encoded watermark. The system can also determine the hard-modulation gain pattern of the gain pattern cluster, which corresponds to this determined character. The system can then apply this determined hard-modulation gain pattern to those frequency bands comprising the given band cluster by multiplying those band signals of the frequency bands comprising the given band cluster by corresponding hard-modulation gains of the determined hard-modulation gain pattern.

In some embodiments, the hard-modulation gains of the hard-modulation gain pattern can take one of a pre-defined high gain value or a pre-defined low gain value. Here the high gain value can be a value that is larger or equal to 1.0, and the low gain value can be a value that is lower than or equal to 0.1. In this scheme, the hard-modulation gains of the hard-modulation gain pattern, which are either the high gain value or low gain value, are pre-defined values which do not depend on properties or characteristics of their corresponding band signals. Here, typically the hard-modulation gain pattern includes at least one high gain value and at least one low gain value. The system can then apply this hard-modulation gain pattern to the bands of the band cluster in a manner that is unconditional. That is, unlike other modulation schemes, this hard-modulation gain pattern does not depend on the characteristics of the band signals of the bands comprising the band cluster.

These methods thus enable the system to synthesize a time-domain watermarked transient frame. Here the system takes the plurality of the band signals of the transient frame, including both modified band signals of the band cluster and the remaining unmodified bands, and produces at least one watermarked transient frame.

The system can then create the output transient watermarked audio signal by recombining the various non-transient frames, any non-watermarked transient frames, and the various watermarked transient frames according to their unique sequential time stamps (e.g., h−1, h, h+1) of the various time overlapping frames. Here this can be done, e.g., by an overlap-and-add process according to the unique sequential time stamps of the time overlapping frames.

Decoding:

Decoding is almost, but not quite, a reverse of the encoding process. In some embodiments, the system can decode at least one binary encoded watermark from a (previously) transient watermarked audio signal by using at least one computer processor (which may or may not be the same processor used to encode the watermark in the first place) to again perform the process of decomposing the audio signal into frames and identifying transient frames.

More specifically, in decoding, the system will segment the transient watermarked audio signal into a plurality of time overlapping frames (e.g., enumerated . . . h−1, h, h+1 . . . ). As before, each frame will have a unique sequential time stamp.

Note that this sequential time stamp is just a way to number or distinguish between the frames. Any numbering scheme may work, and it need not actually be based on time, so long as the sequential order of the frames can somehow be preserved and understood by the system. Indeed, any type of ordering scheme may also be used, including cryptographic schemes, so long as the system can ultimately determine the order of the frames.

As previously discussed, the resulting frames will again be either transient frames comprising transient audio signals or non-transient frames. However, this time, the transient frames will be either watermarked transient frames or non-watermarked transient frames. Presumably, if the audio signal was previously watermarked as previously described, at least one transient frame will be watermarked. Typically, multiple transient frames will be watermarked, but there is no requirement that all transient frames be watermarked.

As before, the system can use a transient detector to distinguish the transient frames and non-transient frames. Also, as before, to detect the watermarked transient frames and ultimately read the watermark, the system will decompose the various transient frames into a plurality of frequency bands. Thus, in some embodiments, the system need not necessarily decompose all transient frames. In some embodiments, the system needs only decompose at least one transient frame to read the watermark.

The system can then start to detect the watermark by comparing the signal magnitudes of the plurality of frequency bands of each transient frame to a detection threshold. This threshold may be pre-computed on that frame for that frame, a pre-determined threshold may be used, or other threshold criteria may be applied.

Here again, it is useful to compare FIG. 9 left side to FIG. 9 right side. The system can then determine which of the transient frames are watermarked transient frames by determining if at least one of the frequency bands has a signal magnitude below the pre-computed detection threshold for the various frequency bands on that frame. This allows the system to determine (or identify) this at least one watermarked transient frame.

For the various watermarked transient frames that the system has detected (e.g., at least one), the system can then extract at least one binary gain pattern by determining, for the various frequency bands, which of the frequency bands has a signal magnitude below a pre-computed extraction threshold (e.g., often for the plurality of frequency bands on that frame). In essence, the system detects these frequency notches (FIG. 9, right) like holes in punched cards or tape. Here we refer to this pattern of notches as a “binary gain pattern”. The system can then use these various binary gain patterns to determine the binary encoded watermark. Although a simple watermark may consist of just one watermarked frame and one character, typically, a more complex watermark will be obtained from a plurality of watermarked frames producing a plurality of watermarked characters.

Some differences between encoding and decoding are that the system needs to determine which transient frames are watermarked. The system also needs to extract the watermark (or at least the previously imprinted binary gain pattern) from these watermarked transient frames.

The system can determine which of the transient frames are watermarked transient frames by determining if at least one of the frame’s frequency bands has a signal magnitude below the pre-computed detection threshold for the various frequency bands on that frame.

This can be done by, for example, determining the maximal (peak) magnitude value of magnitudes of the signal bands comprising the frequency band cluster, thus defining a computed peak magnitude value. To compute the detection threshold, the system can then divide this computed peak magnitude value by a pre-defined detection factor (usually larger than 10). The system can then compare the signal magnitude of each signal band of the frequency band cluster to the computed detection threshold. The system can then use these results to classify the frame as a watermarked or non-watermarked transient frame using the following test:

Watermarked frame if: at least one signal magnitude of at least one signal band of the frequency band cluster is lower than the computed detection threshold.

Non-watermarked frame if: no signal magnitude lower than the detection threshold is present.

Once the decoding system has identified a watermarked transient frame, the system next needs to read the frame in order to extract at least a portion of the watermark (i.e., the binary gain pattern).

Here, for at least one watermarked transient frame, the system can extract each (or at least one) binary gain pattern by determining, for the various frequency bands, which of the frequency bands has a signal magnitude below a given threshold (such as a pre-computed extraction threshold for the various frequency bands on that frame). The system can then use this at least one binary gain pattern to determine the binary encoded watermark.

The system can obtain a set of binary gain patterns (used to obtain the watermark) by computing a binary form of each hard-modulation gain pattern of the gain pattern cluster. Here, the binary gain pattern can be computed from the hard-modulation gain pattern by, for example, setting the binary gain value of the binary gain pattern to 1 if a corresponding hard-modulation gain of the hard-modulation gain pattern is equal to the high gain, or 0 otherwise.

The system can also determine the maximal (peak) magnitude value of magnitudes of the signal bands comprising the frequency band cluster of interest. The system can then compute the extraction threshold by dividing the computed peak magnitude value by a pre-defined extraction factor (usually set larger than 10).

The system can then create a determined binary candidate gain pattern, thus determining the binary values of a binary candidate gain pattern, by comparing the band signal magnitudes of the signal bands comprising the frequency band cluster to the extraction threshold. Here, each binary value is set to 1 if a corresponding signal magnitude of a corresponding signal band is higher than the extraction threshold. By contrast, this binary value is set to 0 if the corresponding signal magnitude of the corresponding signal band is lower than the extraction threshold.

This allows the system to compare each binary candidate gain pattern to each binary gain pattern of the various binary gain patterns, thus finding a resulting binary gain pattern that is equal to this determined binary candidate gain pattern. When the system finds this resulting binary gain pattern, the system can then use this to determine a character associated with the hard-modulation gain pattern that corresponds to the found resulting binary gain pattern. This allows the system to retrieve or read this determined character, and to then subsequently use this determined character to derive at least a portion of the binary encoded watermark.

More Formal Description of the Invention:

As previously discussed, the present invention, in some embodiments thereof, relates to a method and system for digital audio watermarking that enables binary data to be embedded in the acoustic content of an audio signal without perceptibly altering the sound quality for a human listener. The disclosed system enables robust watermarking with watermarks that can be detected and extracted even from recordings captured in highly reverberant and noisy environments.

The present invention will now be described more formally by referencing the appended figures representing preferred embodiments, and by the following algorithms below.

The description below refers to a full-band time-domain digital audio signal S(t) with its corresponding representation in time-frequency domain as a multitude of its spectral frequency components (frequency bands) denoted $\{b_k\}_{k=1}^{M}$. The description also refers to a binary encoded watermark that is to be embedded into the audio signal, and the watermark is represented as a set of binary data bits, each having a value of 0 or 1.

The formal description below operates with the following definitions:

Binary encoded watermark WP—a set of bits carrying digital message (the watermark payload) that is to be embedded into the audio signal, Bit cluster (BC)—a set of bits b of the binary encoded watermark WP, Character cluster (CHC)—a set of binary characters ch associated with values of the corresponding bits b of bit cluster BC, Frequency band cluster (FC)—a set of frequency bands fb used to carry the information associated with bit cluster BC, Gain pattern cluster (GPC)—a set of gains g applied to the respective bands fb of a band cluster FC associated with character cluster CHC.

Suppose we have a binary encoded watermark WP consisting of l watermark bits:

$$WP=\{wb_1,wb_2, \ldots ,wb_l\},$$

and a bit cluster BC representing a sub-set of WP consisting of n bits, n≤l:

$$BC=\{b_1,b_2, \ldots ,b_n\}, \text{ where } BC\subseteq WP.$$

The bit cluster BC is associated with a character cluster CHC, which is a set of characters containing $2^n$ characters $ch_i$ representing all possible bit value combinations for bits of the bit cluster BC:

$$CHC=\{ch_i\}_{i=1}^{2^n}=\{ch_1,ch_2, \ldots ,ch_{2^n}\},$$

wherein each $ch_i \in CHC$ is a set of specific binary values of the bits b comprising BC.

For example, for a bit cluster BC consisting of n=2 bits, there are $2^2=4$ characters $ch_i$ in the character cluster CHC:

$$CHC=\{ch_i\}_{i=1}^{4}=\{\{0\ 0\},\{0\ 1\},\{1\ 0\}\{1\ 1\}\}.$$

In order to encode information of the bit cluster BC into the audio signal, a band cluster FC, consisting of m signal frequency bands $fb_k$ is used:

$$FC=\{fb_k\}_{k=1}^{m}=\{fb_1,fb_2, \ldots ,fb_m\}.$$

The number of bands m must satisfy a specific set of rules defined hereinafter.

The band cluster FC is associated with a gain pattern cluster GPC consisting of p gain patterns $gp_j$:

$$GPC=\{gp_j\}_{j=1}^{p}=\{gp_1,gp_2, \ldots ,gp_p\}.$$

A correspondence between characters $ch_i \in CHC$ and gain patterns $gp_j \in GPC$ is set, i.e., each character $ch_i$ is associated with a gain pattern $gp_j$. This correspondence represents a secret key of the system.

Each gain pattern $gp_j$ represents a set of gains $g_k$ corresponding to the bands $fb_k$ of the band cluster FC, i.e.

$$gp_j=\{g_k\}_{k=1}^{m}=\{g_1,g_2, \ldots ,g_m\},$$

wherein each of the gains $g_k$ has a specific value ≥0.0. Since the number of frequency bands $fb_k$ is m, the total number of corresponding gains $g_k$ in each gain pattern $gp_j$ is m too.

For each character cluster $ch_i$, a gain pattern $gp_j$ may be assigned according to the following three rules:

Rule [a]: each gain pattern $gp_j$ must be unique for each character $ch_i$, no two characters can be assigned to the same gain pattern; however, it is allowed to the number of gain patterns $gp_j$ to be larger than the number of characters $ch_i$;

Rule [b]: the gains $g_k$ comprising the gain pattern $gp_j$ take one of the pre-defined, fixed values: $g_j=G_0$ or $g_j=G_1$, where: $G_1 \geq 1.0$, $G_0 \ll G_1$;

Rule [c]: every gain pattern $gp_j$ must contain at least one gain having the value $G_0$ and at least one gain having the value $G_1$.

The presently disclosed encoding scheme is referred to as "hard-modulation" because it does not use "weak" gains, but only the "hard" gains with values either ≥1.0 or values close to 0.0. In the preferred embodiment, $G_1=1.0$ and $G_0=0.0$, which corresponds to a complete "perforation" of the frequency spectrum by rejecting (nulling) band signals in bands with the "hard" gain $G_0=0.0$ is applied, leaving holes in the spectrum. In another practical embodiment, $G_1=2.0$ and $G_0=0.01$ which corresponds to a signal boost of 6 dB in not attenuated bands and to suppression of the band signal by the "hard" gain of −40 dB in attenuated bands. This distinctive feature of the presently disclosed scheme clearly defines it as a "hard-modulation" watermarked scheme.

In order for the three rules [a,b,c] to be fulfilled, the number of bands m comprising a single band cluster has to be at least n+1; otherwise, either the rule [a] or the rule [c] is violated. For example, the case n=m=1 is prohibited because there is no such arrangement for the gain patterns that will satisfy the rule [c] for every associated character. Therefore, according to the rule [c], the following condition must be fulfilled:

$$m \geq n+1.$$

In some embodiments, the number of bands m may be greater than n+1. On the one hand, these embodiments reduce the watermarking data rate because this leads to spending more frequency bands to encode a single character. On the other hand, it leads to an increased number of "valid" gain patterns (the gain patterns that fulfill the three rules), leaving some of the gain patterns "unused" (i.e., not assigned to any character) and increasing the robustness of the watermark by allowing improved error rejection at the decoding phase, where unassigned patterns are detected and rejected as erroneous.

Rule [c] serves as a synchronization means at the watermark detection stage described hereinafter. The rule guarantees that for any binary data embedded in the bands of the band cluster, there is always at least one "hole" in the spectrum and at least one "peak" (a band with significant signal) that together indicate the presence of the watermark and allow the detector to detect it.

Figure 3:
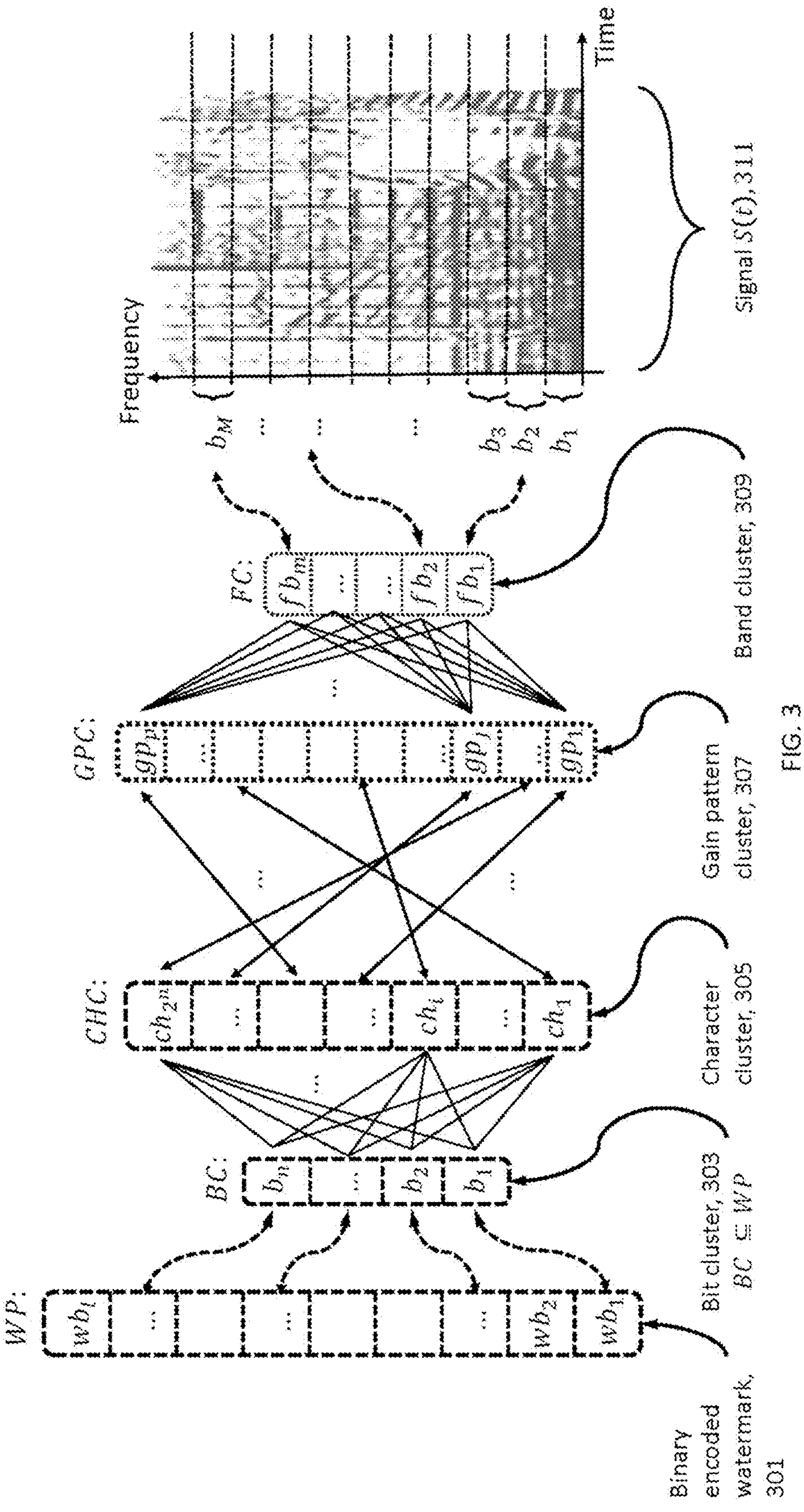
FIG. 3: Binary encoded watermark, bit cluster, character cluster, gain pattern, band cluster, frequency bands of the signal and their correspondence shown in a single mapping diagram.

FIG. 3 shows the binary encoded watermark $WP=\{wb_k\}_{k=1}^m$ (301), the bit cluster $BC=\{b_1, b_2, \ldots, b_n\}$ representing a subset of WP (303), the character cluster $CHC=\{ch_i\}_{i=1}^{n^2}$ (305) wherein each character is representative to values of bits comprising the bit cluster BC, the frequency band cluster $FC=\{fb_k\}_{k=1}^m$ (309) consisting of m frequency bands of time-frequency domain signal S(t), the gain pattern cluster $GPC=\{gp_j\}_{j=1}^P$ (307) wherein each gain pattern $gp_j$ represents a set of gains for the bands $fb_k$ of the band cluster FC, and association of the gain patterns with the characters.

For example, consider a system with the number of bits n=2, the number of bands m=3, and the number of patterns p=4 (example 1):

| Characters, $ch_i$ | | Gain patterns, $gp_j$ |
|---|---|---|
| {0 0} | — > | {0.0 0.0 1.0} |
| {0 1} | — > | {0.0 1.0 1.0} |
| {1 0} | — > | {1.0 0.0 1.0} |
| {1 1} | — > | {1.0 1.0 0.0} |

Note that the rules [a,b,c] are satisfied. In particular, according to the rule [c], each gain pattern contains at least one gain $G_0=0.0$ and at least one gain $G_1=1.0$. Also, according to the rule [b], the gains are either 0.0 or 1.0, which complies with the "hard-modulation" principle. Bands obtaining the gain of 0.0 are rejected (their signal is canceled), producing holes in the output spectrum. In this example, the first two gains of each gain pattern correspond to the value of bits in the corresponding character, while the third gain is used as an auxiliary gain to satisfy the rule [c].

In another example, for n=2, m=4, p=5 (example 2):

| Characters, $ch_i$ | | Gain patterns, $gp_j$ |
|---|---|---|
| {0 0} | — > | {2.0 2.0 0.0 0.0} |
| {0 1} | — > | {0.0 0.0 2.0 2.0} |
| {1 0} | — > | {2.0 0.0 2.0 0.0} |
| {1 1} | — > | {0.0 2.0 0.0 0.0} |
| — | x | {0.0 2.0 2.0 2.0} |

Note that the rules [a,b,c] are also satisfied in this case, even though more frequency bands represent a single character (4 bands instead of 3 as in example 1), and one valid gain pattern complying with the three rules is not associated with any character. This redundancy can be used at the decoding stage as an error rejection mean. Namely, since this redundant gain pattern is not used at the encoding stage to represent characters, it is rejected as erroneous when detected at the decoding stage.

In contrast to example 1, in example 2, the non-attenuating gain values $G_1$ are set to 2.0, which results in a signal boost of 6 dB in the corresponding frequency bands at the encoding stage.

Such enhancement helps to emphasize the frequency components and makes them more robust in reverberant and noisy environments. Moreover, in this example, there is no direct correspondence between the gain values of the gain patterns and the bit values of the corresponding characters. The locations of non-zero gain values do not correspond to the locations of non-zero bit values of the corresponding characters, which represents a security feature (security key). Only the user who is familiar with the correspondence table shown above can extract the bit data correctly.

The above examples demonstrate general principles of the presently disclosed encoding technique and serve only as examples without limiting the scope of the present description. For example, there are various other implementations for different n, m, p, and also different pattern and character mappings.

Now that the necessary definitions are more formally given, we can now more formally describe watermark embedding and watermark detection and extraction.

Formal Description of Watermark Embedding (Encoding):

Bands Decomposition

The data embedding is performed in the time-frequency domain.

The time-domain digital audio signal S(t) is segmented, usually by one or more computer processors, into a series of overlapping frames H consisting of N samples each, and the frame signals are weighted with a suitable weighting window function such as the Hann or Hamming window. The overlapping segmentation is a requirement for signal resynthesis from its modified components on the last stage of the encoding procedure.

The segmentation of the audio signal into overlapping frames is depicted in FIG. 4. The time-domain digital audio signal S(t) is shown as a waveform 401 on the time-amplitude plot. The audio signal is segmented into a sequence of signal frames depicted as 403, where the frames have sequential numbers . . . , h−1, h, h+1, . . . and overlap by more than 50% with each other.

Figure 5:
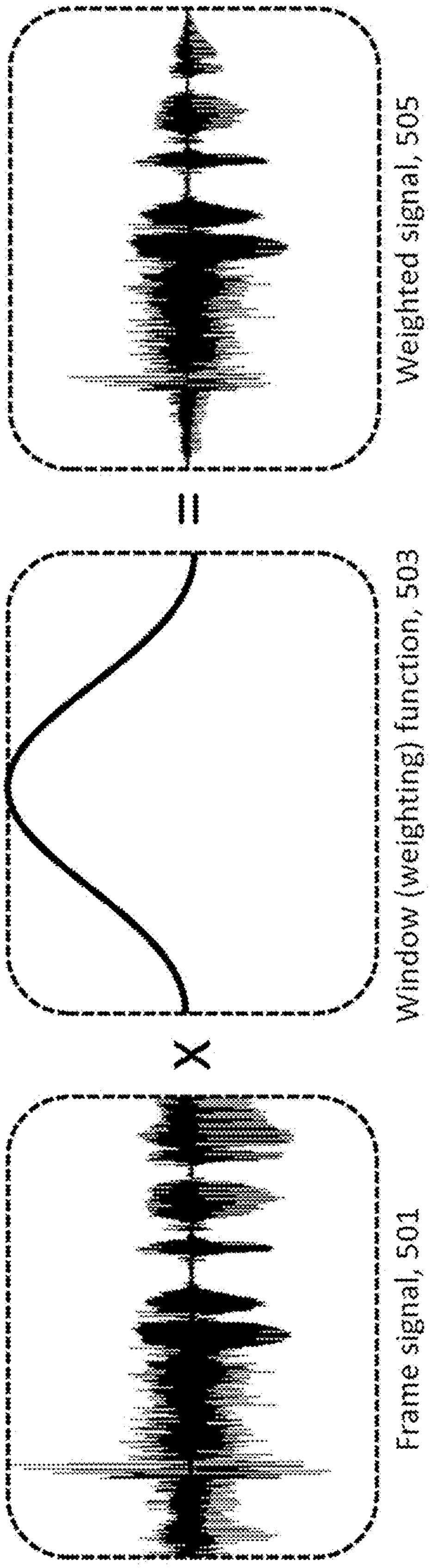
FIG. 5: Applying a window function to the frame signal.

Weighting the frame time-domain signal with a window function is depicted in the FIG. 5. Frame signal sample data 501 is multiplied by the window function 503 to produce the weighted signal frame 505.

Each frame H of the processed signal S is then decomposed into M non-overlapping frequency bands $\{b_k\}_{k=1}^M$ in the frequency domain, and a sub-set consisting of m bands, $m \le M$, is selected to form the frequency band cluster $FC=\{fb_k\}_{k=1}^m=\{fb_1, fb_2, \ldots, fb_m\}$, wherein $FC \subseteq \{b_k\}_{k=1}^M$. The bands can start and end at arbitrary frequencies, can be distributed uniformly or non-uniformly, and their bandwidth can be selected arbitrarily. The frequency bands must not overlap in frequency.

Figure 6:
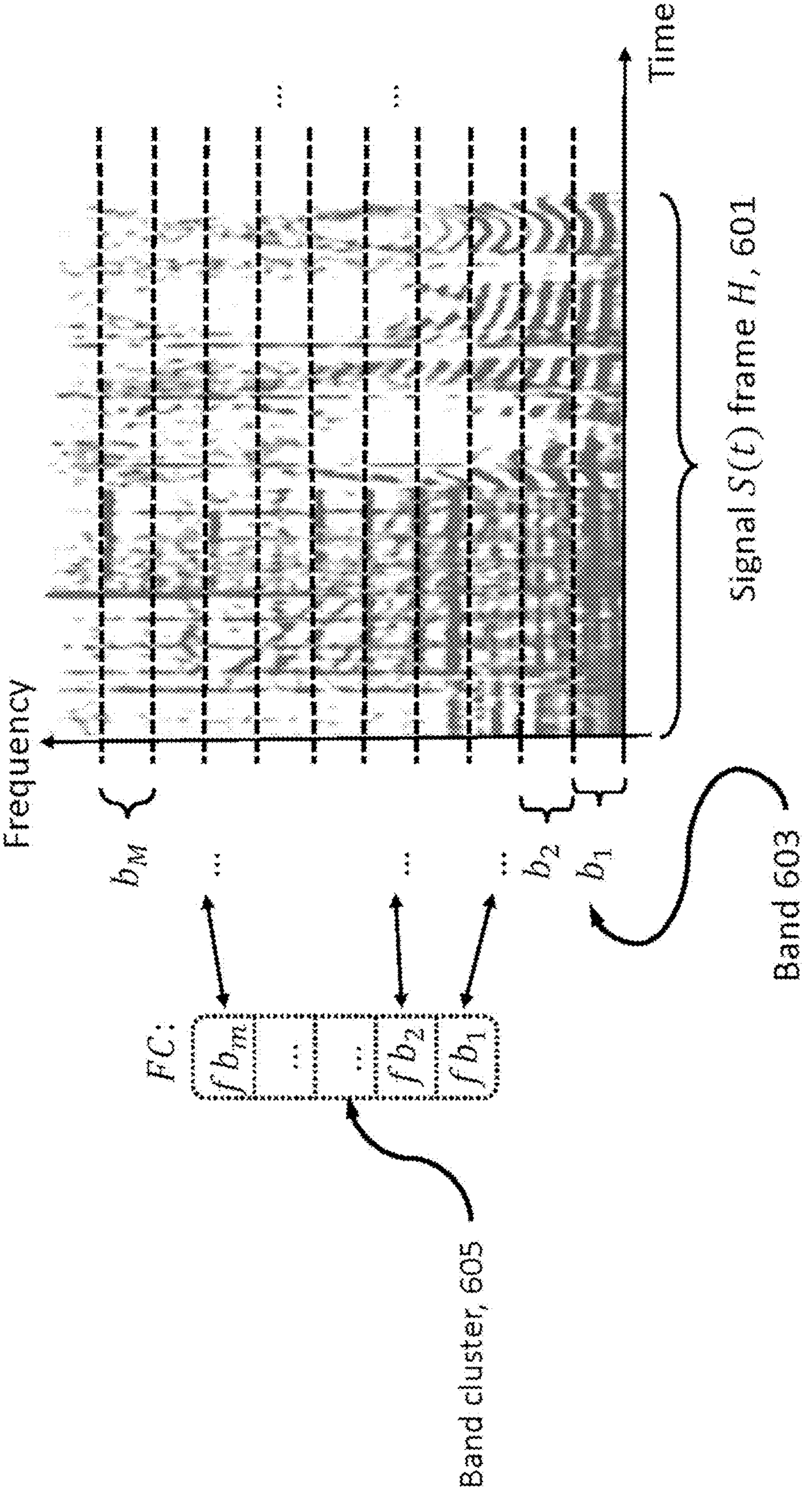
FIG. 6: Decomposing a frame signal into non-overlapping frequency bands.

In one embodiment, the decomposition of the frame signal into frequency band signals is done using FFT (Fast Fourier Transform). In another embodiment, the decomposition can be done using a bank of band-pass filters. The decomposition is illustrated in FIG. 6. The signal frame H of the signal S(t) is depicted as 601, and is decomposed into M frequency bands $\{b_k\}_{k=1}^M$, the band $b_1$ is depicted as 603, and $m \le M$ frequency bands $\{fb_k\}_{k=1}^m$, wherein $\{fb_k\}_{k=1}^m \subseteq \{b_{k'}\}_{k'=1}^M$, are selected to comprise the band cluster FC depicted as 605.

In order to reduce the perceptibility of the signal changes introduced by the encoding process, in a preferred embodiment, the frequency bands $fb_k$ are located in the frequency region above 1 kHz.

Practical experiments show that frequency bands wider than 250 Hz provide the best robustness, while the watermarks remain almost inaudible when applied to transients.

Detecting Transients

The dynamics of the processed digital audio signal S(t), i.e., its spectral structure and evolution of its magnitude or spectral energy over time, is continuously monitored by a special transient detection mechanism to detect signal intervals containing transients.

As explained hereinbefore, transients are short intervals of the acoustic signal in which the signal evolves significantly and rapidly. An example of a transient signal is a sound produced by an acoustic instrument immediately after the excitation (e.g., a hammer strike) is applied. Another example is a speech sibilant (such as [s] as in "sip", [z] as in "zip", [f] as in "ship") and a non-sibilant fricative (such as [f] as in "fine", [θ] as in "thing", [v] as in "vine", etc.). In most sounds in nature, transients are characterized by an abrupt increase in signal energy with rapidly evolving spectral structure, usually within an interval of 50 ms or so.

FIG. 1 shows a generalized explanation of "onset", "attack", "decay" and "transient" phases of a sound signal in a time-domain waveform plot (top) and in a time-frequency spectrogram plot (bottom).

In the present method, the transient detector is developed and used to detect signal frames containing or falling on signal intervals with transients. As a result of its operation, each signal frame is classified as a transient frame or non-transient frame. Namely, if a signal frame falls on a transient, the frame is classified as a transient frame; otherwise, the frame is classified as a non-transient frame.

Figure 7:
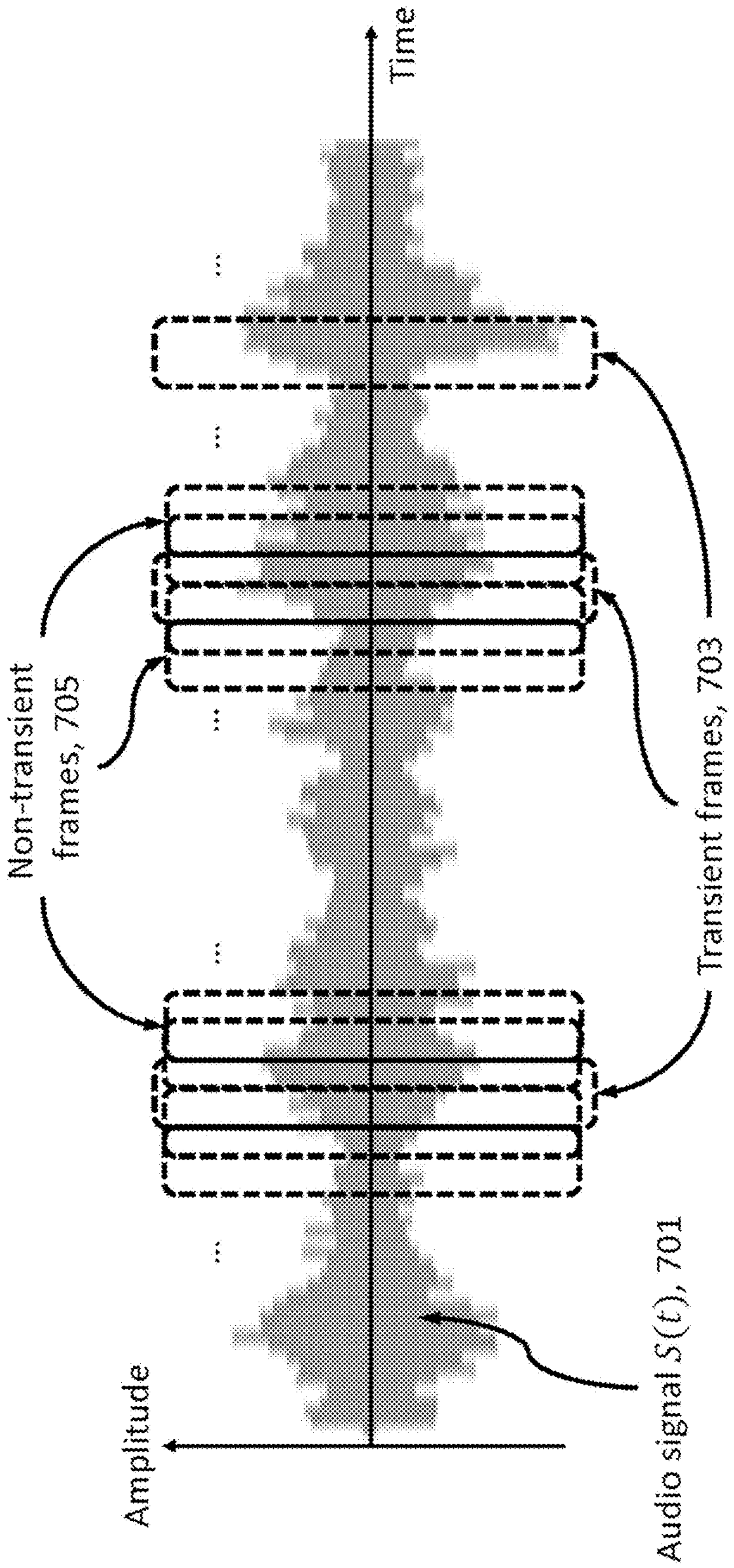
FIG. 7: Selecting transient frames containing signal transients.

FIG. 7 shows time-domain audio signal 701 with transient frames 703; the transient frames contain transients. Other non-transient frames are depicted as 705.

The description hereinafter deals with exemplary embodiments of the transient detector.

In one embodiment, the detector is configured to continuously follow the time-domain signal amplitude envelope to detect its abrupt changes. The envelope $E_1(t)$ of the time-domain signal S(t) is calculated as:

$$E_1(t) = \frac{1}{d}\sum_{q=-\frac{d}{2}}^{\frac{d}{2}-1} |S(t+q)| W(q),$$

where W(q) is a d-point window serving as a smoothing kernel and having a symmetric shape around its center at q=0. For example, W can be a Hann window.

In another embodiment, the system calculates the envelope $E_2(t)$ of the time-domain signal S(t) calculated using local energy:

$$E_2(t) = \frac{1}{d}\sum_{q=-\frac{d}{2}}^{\frac{d}{2}-1} |S(t+q)|^2 W(q).$$

In one embodiment of the transient detector based on time-domain amplitude envelope measurement, the detector uses the calculated amplitude envelope E(t) to obtain the envelope T(h) on the h-th frame H by computing peak, average or median value of the envelope E(t) for all $t \in H$. For example, in the case of average:

$$T(h) = \frac{1}{N}\sum_{t=1}^{N} E(t).$$

In another embodiment, the transient detector envelope T(h) is obtained from the single value of E(t) for t falling on the center of the frame H. This can be written as:

$$T(h)=E(t),$$

wherein t corresponds to a signal sample located at the center of the frame H.

The described transient detection methods or their possible variations operating with time-domain signal provide reasonable performance in detecting transients in certain types of signals where, for example, strong percussive transients appear on a relatively quiet background. Other methods of detecting time-domain transients are also possible.

In another embodiment of the transient detection mechanism, the detector is configured to continuously follow the spectrum of the signal to detect frames on which the signal energy increases abruptly, compared to the previous frame, in a substantial part of the signal frequency spectrum. In a particular implementation of such signal transient detector, for each k-th frequency band $b_k$ of h-th frame, an energy $e_k^h$ is calculated. The energy $e_k^h$ can be calculated as average energy, peak energy, band signal magnitude or else, depending on the decomposition scheme used and measurement methodology preferred. The envelope T(h) on h-th signal frame H can be calculated as follows:

$$T(h) = \frac{1}{M}\sum_{k=1}^{M} e_k^h w_k,$$

wherein M is the total number of frequency bands, $w_k$ is a weight for the band $b_k$. The weights $\{w_k\}_{k=1}^M$ can be chosen to favor the higher frequency components (e.g., the speech fricatives), and neglect the lower frequency components, making the detector more sensitive to wider-band higher-frequency transients.

Various other transient detection methods can also be used to detect transients; such methods are known to those skilled in the field.

Based on the calculated envelope T(h), more specifically, based on the shape of T(h), its evolution and steepness, the h-th signal frame H is classified as a transient frame or non-transient frame.

In one embodiment, the h-th frame H is classified as a transient frame if $$\frac{T(h)}{T(h-1)} > Q$$

for some steepness factor Q>1. The factor Q should be set large enough (e.g., Q=8) to ensure operation with only abrupt transients. The frame is classified as non-transient otherwise.

In another embodiment, representing a preferred embodiment, in addition to the envelope T(h), a spectral flatness estimation V(h) is calculated for each h-th frame H. The spectral flatness measure is used to distinguish numerically between signals with harmonic structure (e.g., pure tones or speech vowels) and noise-like signals with non-harmonic structure (e.g., speech fricatives or drum sounds). The spectral flatness is calculated as the ratio between the geometric mean of the power spectrum and the arithmetic mean of the power spectrum on the frame:

$$V(h) = \frac{\exp\left(\frac{1}{M}\sum_{k=1}^{M}\ln(e_k^h)\right)}{\frac{1}{M}\sum_{k=1}^{M}e_k^h}.$$

A signal with low spectral flatness or, in other words, with high tonality receives values of V(h) close to 0.0. A signal with higher spectral flatness (noise-like signal) receives vales of V(h) close to 1.0. Different variations of the spectral flatness calculation formula exist.

The signal frame H is classified as the transient frame or non-transient frame based on the calculated envelope T(h) and the spectral flatness V(h), and also based on their evolution and steepness. For example, in a preferred embodiment, the h-th frame H is classified as transient if:

$$\frac{T(h)}{T(h-1)} > Q, \text{ and } V(h) > R,$$

for some steepness factor Q>1 and for some spectral flatness threshold 0<R≤1. The frame is classified as the non-transient frame if the condition is not fulfilled.

Depending on the selected frame size N, the sampling rate of the signal S(t), and its acoustic content, a series of subsequent frames falling on the detected transient may be classified as transient. The system architect may apply additional logic to limit the number of subsequent transient frames and add hysteresis to the decisions regarding crossing required thresholds to avoid jitter.

The transient detector can be set to be "sensitive" when the thresholds Q and R are relatively low, resulting in a more "aggressive" watermarking as more frames have a chance to be classified as transient. However, it can also be "insensitive" when thresholds Q and R are relatively high, resulting in fewer transient frames.

Embedding Watermark Characters

The description hereinafter deals with the process of watermark embedding into the time-domain audio signal S(t).

Embedding of a binary encoded watermark WP occurs only on signal frames classified as transient frames by the transient detector. The signal of non-transient frames is not being altered and remains intact.

Embedding of a character $ch_i \in CHC$ carrying a specific value of the bit cluster $BC \subseteq WP$ is done by "embossment" or "imprinting" the gain pattern $gp_j=\{g_1, g_2, \ldots, g_m\} \in GPC$, associated with the character $ch_i$, in the frequency band cluster FC consisting of m frequency bands $\{fb_k\}_{k=1}^{m}$ of the transient frame H. The imprinting is done by applying gains $\{g_1, g_2, \ldots, g_m\}$ comprising the gain pattern $gp_j$ to the corresponding bands $\{fb_1, fb_2, \ldots, fb_m\}$ of the band cluster FC. More specifically, the signal of band $fb_k$ for k=1, 2, . . . , m is multiplied by the value of the corresponding gain $g_k$. In the preferred embodiment, the imprinting is performed unconditionally and without reference to the content of the signal of the band $fb_k$. At this stage, no measurements are required. Since the gains $g_k$ are either close to 0.0 or equal to or greater than 1.0, such watermark imprinting results in either suppression of the signal in the frequency band to which the gain $G_0 \ll 1.0$ was applied, or in no change or in signal amplification in the band to which $G_1 \geq 1.0$ was applied.

Figure 8:
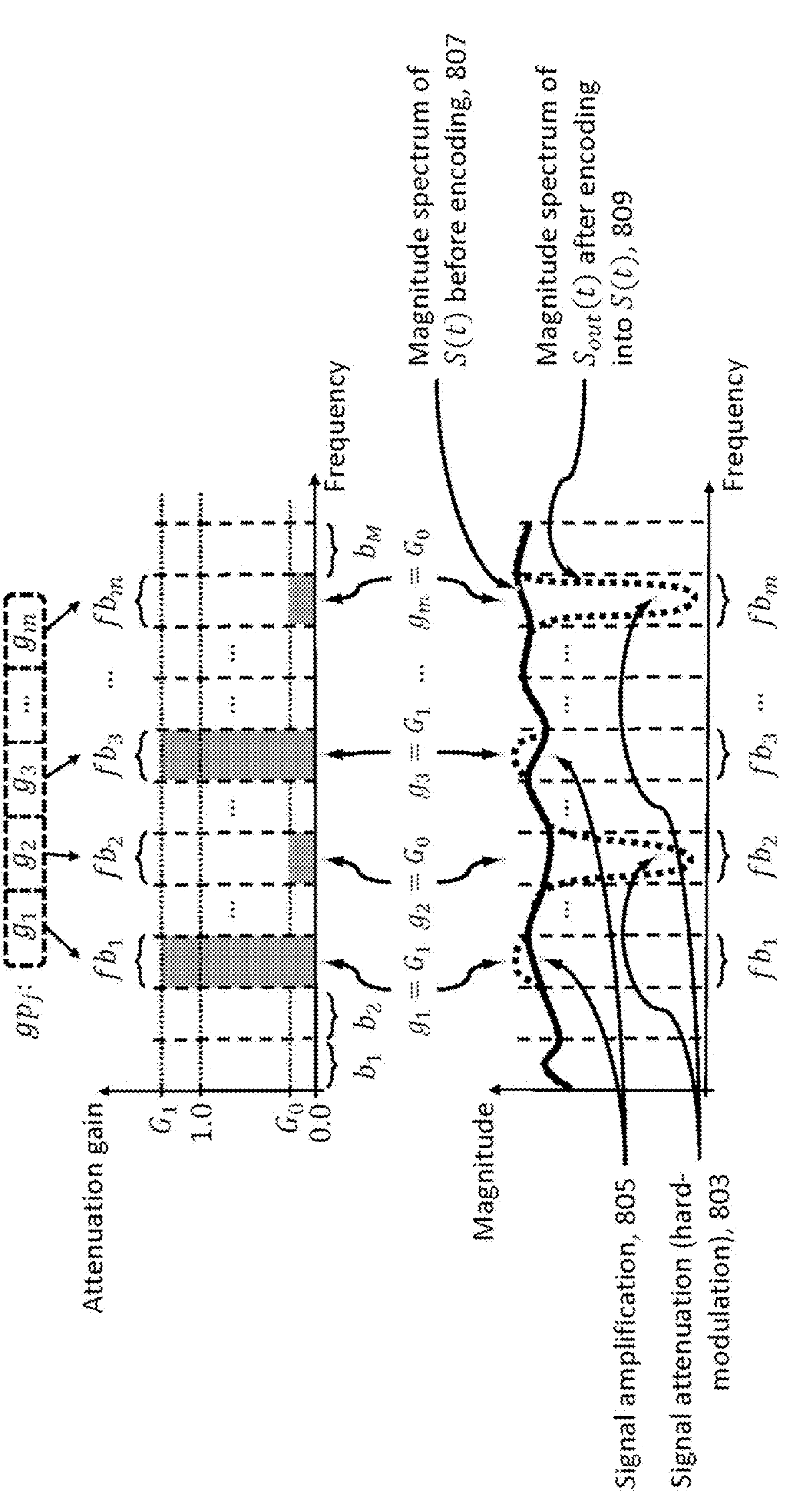
FIG. 8: Applying gains of the gain pattern to the corresponding bands of the band cluster by altering the signal level of sub-band signals according to the gain value resulting in hard-modulation "holes" in the signal spectrum in some bands.

FIG. 8 illustrates the embedding process. The gains $\{g_1, g_2, \ldots, g_m\}$ of the gain pattern $gp_j$ are shown in the upper plot with gray bars, where each gain $g_k$ has a value of $G_1 \geq 1.0$ or $G_0=0.01$ and corresponds to a particular frequency band $fb_k$ of the band cluster. The magnitude spectrum of the input signal S(t) is shown in the lower plot with a bold solid gray curve 807. The resulting (watermarked) magnitude spectrum of the output signal $S_{out}(t)$, which is obtained by multiplying the band signals $fb_k$ by the corresponding gains $g_k$ and results in a signal amplification 805 or signal attenuation (rejection) 803, is shown with a bold dashed black line 809.

Synthesis

The output signal $S_{out}(t)$ is generated by the system from the sequence of watermarked transient frames, non-watermarked transient frames, and not watermarked non-transient frames of the signal S(t). In the case of FFT-based frequency decomposition, first, the watermarked frame time-domain data is synthesized from the watermarked frame frequency band data using inverse FFT. The time-domain output signal data $S_{out}(t)$ is then generated by combining the sequence of watermarked and not watermarked time-domain frames using overlap-and-add procedure.

FIG. 9 shows the transformation that the transient frame H of the input signal S(t) undergoes when the watermark is embedded. The signal S(t) shown as 901 on a time-frequency spectrogram plot, its transient frame H, which contains the transient, is shown as 905. As a result of the encoding process applied to the band signals $fb_k$ in frame H, the band signals were amplified (907) or attenuated/rejected (909), resulting in "perforations" ("holes") in the spectrum. The resulting output (watermarked) signal $S_{out}(t)$ is shown as 903.

It should be noted that only the frame data of transient frames need to be synthesized. The frame data of non-transient frames remain intact during the encoding process and can therefore be used as-is to produce the output signal.

Latency

The algorithmic latency of the presently disclosed watermark embedding scheme mainly depends on the latency required by the transient detector to analyze the signal frame and classify it as a transient frame or non-transient frame. In simple implementations, the detector only holds a history of a few frames (at least one frame is required to compare the envelope values of the current and the previous frame), with no look-ahead. In this case, the detector operates with zero latency because it makes instant decisions on each incoming frame. Thus, the total latency of such a scheme is equal to the latency of the decomposition and synthesis scheme used. In more sophisticated implementations, the transient detector can implement logic based on a look-ahead frame buffer that makes decisions for frames in the history buffer. In such cases, the total latency is composed of the size of the look-ahead buffer and the latency of the decomposition and synthesis scheme. In an example implementation working with signals sampled at 48000 Hz and using an FFT-based decomposition scheme with 1024 FFT taps and 75% frame overlap, the total latency of the encoding scheme is 16 ms.

Figure 11:
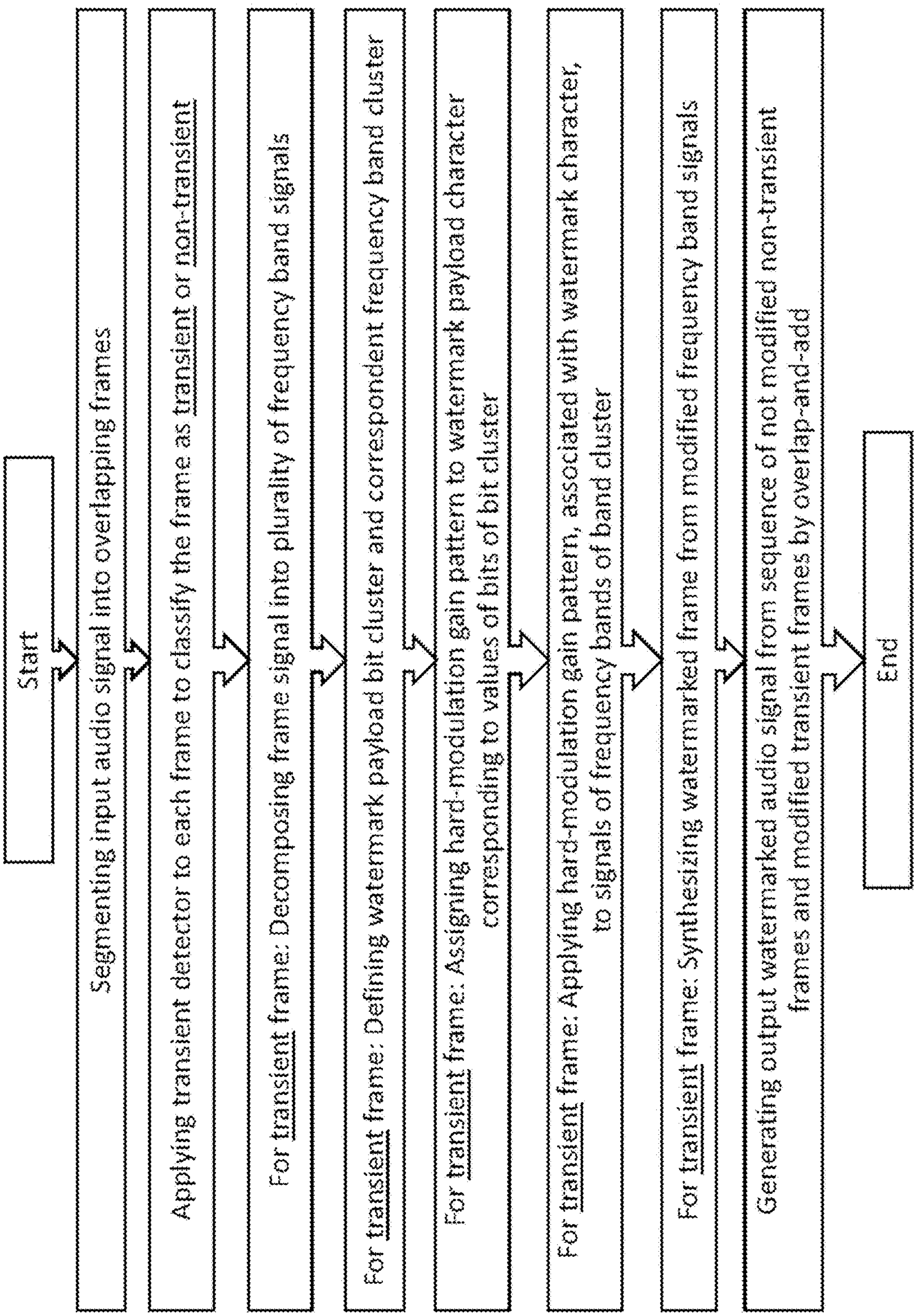
FIG. 11: Simplified flowchart of the watermark embedding procedure.

A summary of the watermark embedding process is depicted in FIG. 11 by means of a simplified flowchart summarizing the process.

Formal Description of Watermark Detection and Extraction (Decoding):

The following description of watermark detection and extraction, collectively referred to as "decoding", uses the same terminology and definitions as those used in the description of the encoding process.

In the preferred embodiment, the decoding and extraction mechanisms implement a "blind" watermarking approach that does not imply access to the original, non-watermarked audio signal. Such blind detection and extraction are described hereinafter.

On the decoding stage, the frequency band decomposition of the analyzed signal S'(t) is performed similarly to the encoding stage.

Transient detection follows the same mechanism as described hereinabove. Signal frames that fall on intervals of transients are classified as transient frames (i.e., frames that may carry watermarks), and other frames are classified as non-transient frames. In the preferred embodiment, the steepness factor Q and the spectral flatness threshold R are set lower than at the encoding stage. This relaxation is made to tolerate possible signal transformations, distortions and noises caused by the transmission of the watermarked output signal $S_{out}(t)$ from the watermark encoder to the watermark detector and extractor over broadcast channels and/or by the transducing over the air.

Signal frames classified as non-transient frames are not considered by the watermark detector and are not processed.

The watermark detector further analyzes signal frames classified as transient frames.

According to rule [c], every valid gain pattern $gp_j$ corresponding to a watermark character $ch_i$ contains at least one "high gain" ($G_1 \geq 1.0$) and at least one "low gain" $G_0 << G_1$. Thus, any valid gain pattern $gp_j$ imprinted in the audio signal leaves at least one frequency band with significant magnitude and at least one band with a completely rejected or at least significantly attenuated signal. This assumption is used to search and detect a watermark in the transient frame.

For the transient frame H, the detector calculates frequency band magnitudes $\{mb_k\}_{k=1}^m$ in the m signal bands $\{fb_k\}_{k=1}^m$ comprising the band cluster FC. An anchor magnitude amb is calculated as $$amb = \max(\{mb_k\}_{k=1}^m).$$

The anchor magnitude is assumed to correspond to one of the bands with the high gain $G_1$ of some gain pattern $gp_j$, which is unknown at this stage.

A pre-defined detection factor $D_{det} << 1.0$ is used to further analyze the band signal magnitudes and decide whether the transient frame is a watermarked frame or non-watermarked frame. Since each valid gain pattern contains at least one band with rejected or at least significantly attenuated signal, the detector looks for a band whose magnitude is significantly lower than the anchor magnitude. The following synchronization condition is tested:

$$\min(\{mb_k\}_{k=1}^m) < D_{det} \cdot amb.$$

If the synchronization condition is satisfied, then at least one band k with magnitude $mb_k < D_{det} \cdot amb$ exists, thus satisfying the rule [c]. In this case, the frame is classified as a watermarked frame and further processed by the watermark extractor described hereinafter. Otherwise, the frame is discarded as a non-watermarked frame, and the processing of the frame H ends.

Practical experiments show that even in highly reverberant acoustic environments, reliable detection results can be achieved with $D_{det} < 0.03$, i.e., −30 dB relative to the anchor magnitude.

In the next step, the watermark extractor computes a candidate pattern $gp_{cand}$ by further analyzing the frequency band magnitudes $\{mb_k\}_{k=1}^m$. A pre-defined extraction factor $D_{ext}$ where $D_{det} \leq D_{ext} << 1.0$ is used to extract the candidate pattern $gp^{cand}$ corresponding to a yet unknown gain pattern $gp_j$. More specifically, $$gp^{cand} = \{g_k^{cand}\}_{k=1}^m = \{g_1^{cand}, g_2^{cand}, g_m^{cand}\},$$

where $$g_k^{cand} = \begin{cases} 0 & \text{if } mb_k < D_{ext} \cdot amb, \\ 1 & \text{otherwise} \end{cases}$$

Since the gains $g_k^{cand}$ of the extracted candidate gain pattern $gp^{cand}$ are binary, in order to compare the candidate pattern to valid gain patterns $\{gp_j\}_{j=1}^p$ of the gain pattern cluster GPC, the patterns $\{gp_j\}_{j=1}^p$ are converted into binary representation as follows:

$$gp'_j = \begin{cases} 1 & \text{if } \frac{gp_j}{G_1} = 1 \\ 0 & \text{otherwise} \end{cases}$$

for j=1, 2, . . . , p. This operation translates all gain patters $gp_j$ into the binary form $gp'_j$. For example, the gain pattern {2.0 2.0 0.01 0.01}, wherein $G_1$=2.0 and $G_0$=0.01, translates into the binary gain pattern {1 1 0 0}.

Finally, the candidate binary pattern $gp^{cand}$ is compared to the binary form $gp'_j$ of the valid gain patterns $gp_j$. If $gp^{cand} = gp'_j$ for some j, a character $ch_i$ associated with pattern $gp_j$ is extracted, and the character extraction is declared successful. If the pattern $gp_j$ is redundant, i.e., not associated with any character, or if no correspondence is found between $gp^{cand}$ and gp'j for any j=1, 2, . . . p, the character extraction is declared unsuccessful.

If the character extraction is successful, the watermark extractor yields the character.

Figure 10:
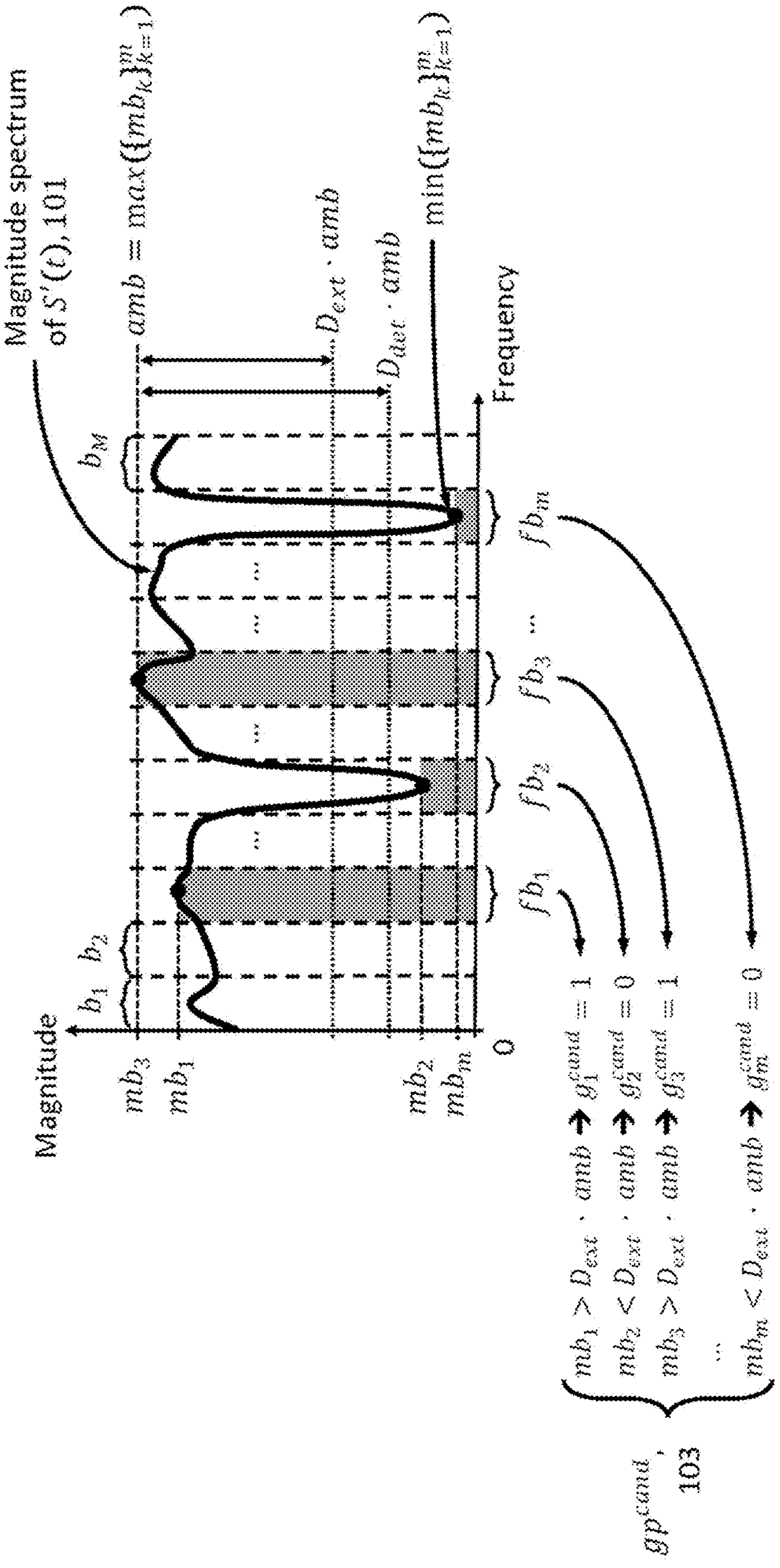
FIG. 10: Illustration of the decoding process in which band signal magnitudes of the band cluster are measured, and the corresponding data bits of the binary candidate gain pattern are computed based on the thresholding procedure.

The decoding process is shown in FIG. 10. A magnitude spectrum 101 of the signal S'(t) is shown in a magnitude-frequency plot with signal bands $b_1, b_2, \ldots, b_M$ and band cluster bands $fb_1, fb_2, \ldots, fb_m$. The band magnitude values $mb_1, mb_2, \ldots, mb_m$ of the corresponding frequency bands, including the computed anchor magnitude amb, are shown on the magnitude axis. The computed detection threshold $D_{det} \cdot amb$ and the extraction threshold $D_{ext} \cdot amb$ are shown on the right-hand side of the plot. The frame is considered watermarked frame since $$\min(\{mb_k\}=1) < D_{det} \cdot amb.$$

Extraction computations and extracted binary values $g_1^{cand}, g_2^{cand}, \ldots, g_m^{cand}$ of the candidate gain pattern $gp^{cand}$ are shown as 103.

Combining Single Payload from Multiple Clusters

In order to extract the entire watermark WP, the procedure of character extraction from the specific band cluster FC detailed hereinabove is repeated for all remaining band clusters of the frame. If character extraction from all band clusters is successful, the corresponding extracted characters are combined, and the process yields a complete binary encoded watermark. In the simplest embodiment, if character extraction for one of the band clusters is unsuccessful on the frame H then, the frame H is discarded, and all successfully extracted characters on this frame are discarded too. In a more sophisticated embodiment, the results of successful character extractions are collected for reuse on subsequent frames. For example, a frame $H_1$ may yield successfully extracted character from a band cluster $FC_A$ associated with one subset of the frequency bands, and a frame $H_2$ may yield successfully extracted character from a band cluster $FC_B$ associated with another subset of the frequency bands, and the characters extracted from the two frames and the two band clusters are combined, resulting in the extraction of the complete binary encoded watermark.

Subsequent Frames Treatment

Since the transient detector may classify multiple consecutive frames as transient frames and yield a watermark, an auxiliary logic may be applied to the detection and extraction results. In the most trivial implementation, no auxiliary logic is applied, and the extraction results at each frame are handled separately. In another embodiment, extraction of a character is considered "confirmed" if at least two consecutive transient frames yield the same character from the same band cluster. In yet another embodiment, extraction of a character is considered "confirmed" if multiple, not necessarily subsequent, transient frames yield the same character from the same band cluster, and the frames are within a pre-defined time interval. Other variations of the confirmation logic are possible.

Non-Blind Watermarking

Decoding and extraction can also be implemented in the form of a non-blind technique that requires access to the original, non-watermarked audio signal at the decoding stage. In this case, the character extraction technique described above may be implemented by analyzing and comparing frequency band magnitudes relative to the bands of the source non-watermarked audio signal. In addition, simplifications and relaxations can be made on the encoding phase, for example, in the rules for forming the gain patterns. Such non-blind encoding and decoding implementations are beyond the scope of the present disclosure, but will be apparent to those skilled in the art who are familiar with the methods of the invention disclosed in the present work.

Multi-Channel Audio

The described watermarking technique can be applied to single- and multi-channel audio. In the preferred embodiment of the multi-channel encoder, the transient detector operates on the signal $S^{MIX}(t)$ comprising a mixture of all C channels of the multi-channel audio recording, i.e.

$$S^{MIX}(t) = \sum_{c=1}^{C} S_c(t),$$

where in $S_c(t)$ is a c-th channel of the multi-channel audio recording. Frames classified as transient frames for the $S^{MIX}(t)$, are also classified as transient for all the corresponding channels $S_c(t)$, c=1, 2, . . . , C of the multi-channel signal, and conversely, frames classified as non-transient frames for the $S^{MIX}(t)$ are classified as non-transient for all the channels $S_c(t)$. For each transient frame, an identical embedding procedure is applied to each $S_c(t)$, c=1, 2, . . . , C of the multi-channel recording resulting in the imprinting of identical gain patterns at identical time/frequency positions.

The watermark decoding from a multi-channel audio recording is done independently for each signal channel.

CRC & Error Correction

The described watermarking method operates on a binary encoded watermark WP consisting of an arbitrary binary message. In some embodiments, the system may further comprise error detection and/or error correction codes as part of the watermark and their corresponding checks at the decoding stage to increase the robustness of the watermark and the reliability of the extraction.

Figure 12:
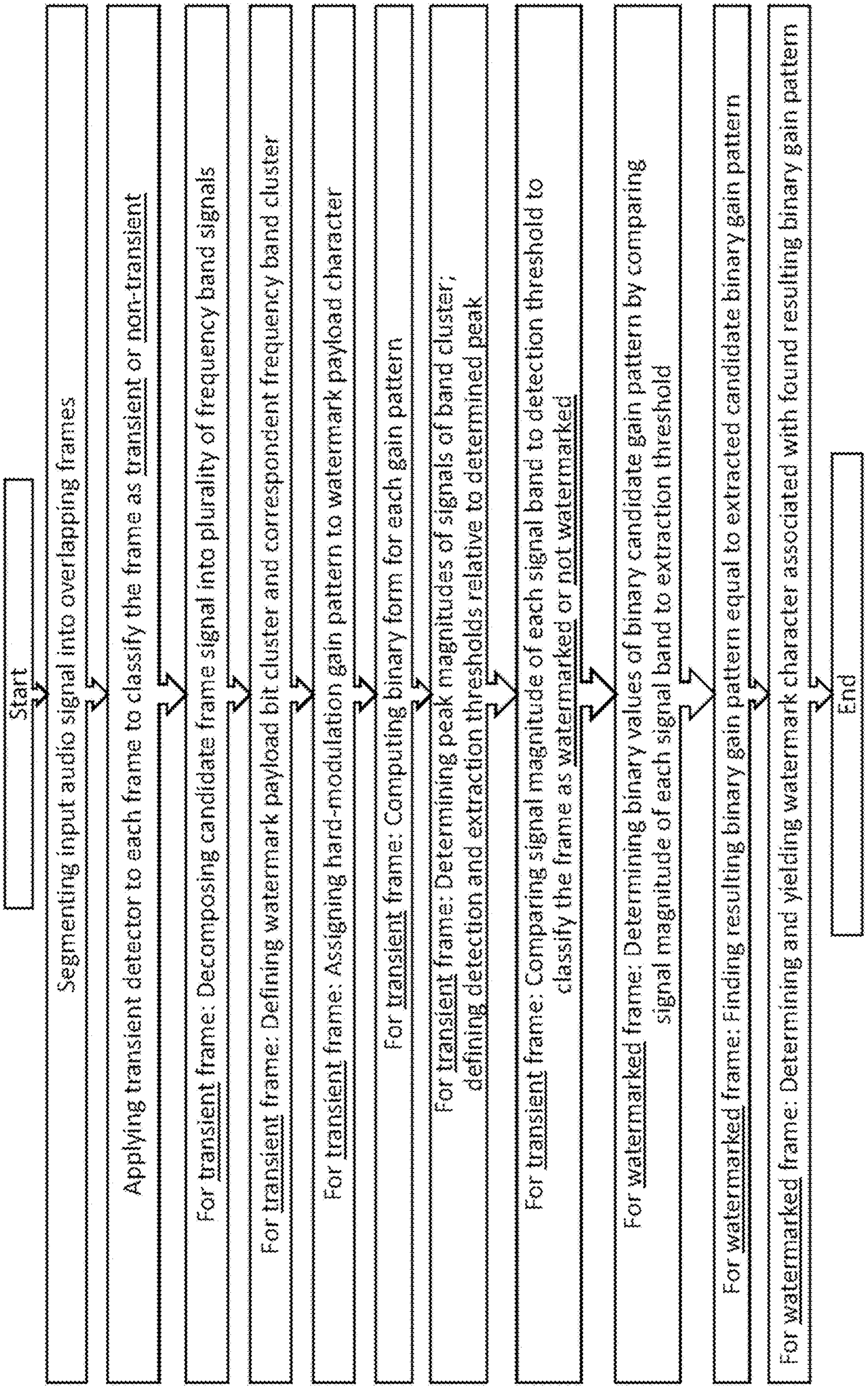
FIG. 12: Simplified flowchart of the watermark decoding procedure.

A summary of the watermark decoding (detection and extraction) process is depicted in FIG. 12 by means of a simplified flowchart summarizing the process.

The invention claimed is:

1. A transient acoustic watermark method, said method comprising at least one of:

a) encoding at least one binary encoded watermark into an audio signal by using at least a first computer processor to perform the steps of:

segmenting said audio signal into a plurality of time overlapping frames, each frame having a unique sequential time stamp;

using a transient detector to determine which said frames are transient frames comprising transient audio signals, and which of said frames are non-transient frames;

decomposing at least some of said transient frames into a plurality of frequency bands;

encoding at least one binary encoded watermark into at least one transient frame by hard-modulating the signal magnitudes of said plurality of frequency bands according to said at least one binary encoded watermark, thereby creating at least one watermarked transient frame;

creating a transient watermarked audio signal by recombining said non-transient frames, any non-watermarked transient frames, and said at least one watermarked transient frame according to said unique sequential time stamps of said time overlapping frames;

b) decoding at least one binary encoded watermark from a transient watermarked audio signal by using either said first computer processor or a second computer processor to perform the steps of:

segmenting said transient watermarked audio signal into a plurality of time overlapping frames, each frame having a unique sequential time stamp, and wherein said frames are either transient frames comprising transient audio signals or non-transient frames, and wherein said transient frames are either watermarked transient frames or non-watermarked transient frames;

using a transient detector to distinguish said transient frames from said non-transient frames;

decomposing said transient frames into a plurality of frequency bands;

comparing signal magnitudes of said plurality of frequency bands of each said transient frame to a detection threshold pre-computed on that frame;

determining which of said transient frames are watermarked transient frames by determining if at least one of said frequency bands has a signal magnitude below said pre-computed detection threshold for said plurality of frequency bands on that frame, thus determining at least one watermarked transient frame;

for at least one watermarked transient frame, extracting at least one binary gain pattern by determining, for said plurality of frequency bands, which of said frequency bands has a signal magnitude below a pre-computed extraction threshold for said plurality of frequency bands on that frame;

using said at least one binary gain pattern to determine said binary encoded watermark.

2. The method of claim 1, wherein said plurality of time overlapping frames comprise frames of equal time lengths wherein each subsequent signal frame at least partially overlaps in time with its proceeding frame, said time overlap being at least 50% of said time lengths.

3. The method of claim 1, wherein said transient frames comprise frames characterized by at least one of an abrupt increase of time-domain signal amplitude envelope, or an abrupt increase of signal spectral energy, or an abrupt increase of zero-crossing rate, or an abrupt increase of spectral flatness, or an abrupt decrease of harmonicity;

and wherein said transient detector determines said transient frames by measuring and tracking at least one of time-domain amplitude envelope values, spectral-domain signal energy values, zero-crossing rate values, spectral flatness values, or harmonicity values on both a given frame and its preceding frame, thereby producing tracked values;

and when a change of said tracked value over at least the time difference between said given frame and its preceding frame exceeds a preset criterion, then determining that said frame is any of a transient or non-transient frame.

4. The method of claim 1, wherein encoding at least one binary encoded watermark onto at least one transient frame by hard-modulating the signal magnitudes of said plurality of frequency bands according to said at least one binary encoded watermark, thereby creating at least one watermarked transient frame, further comprises:

selecting, using at least one processor, a plurality of bit positions in a binary encoded watermark to produce a bit cluster;

defining a character representing a set of bit values of the bits at positions comprising the bit cluster, and producing a character cluster representing a set of characters in which each character represents a specific set of bit values of bits of the bit cluster, wherein there is a character for each possible set of bit values of the bits comprising the bit cluster;

selecting a subset of bands from the plurality of the frequency bands to produce a frequency band cluster;

defining a hard-modulation gain pattern representing a set of hard-modulation gain values for those bands comprising said frequency band cluster, and producing a gain pattern cluster representing a set of the hard-modulation gain patterns in which each hard-modulation gain pattern represents a specific set of hard-modulation gain values of bands of the band cluster;

associating each unique character from the character cluster with a unique hard-modulation gain pattern from the gain pattern cluster;

determining the character of the character cluster, which corresponds to those bit values contained at corresponding bit positions of the binary encoded watermark;

determining the hard-modulation gain pattern of the gain pattern cluster which corresponds to said determined character;

applying said determined hard-modulation gain pattern to those bands comprising said band cluster by multiplying those band signals of the bands comprising said band cluster by corresponding hard-modulation gains of said determined hard-modulation gain pattern;

synthesizing a time-domain watermarked transient frame from the plurality of the band signals of the transient frame, including both modified band signals of the band cluster and the remaining unmodified bands, thereby producing said at least one watermarked transient frame.

5. The method of claim 4, wherein said band cluster comprises at least n+1 bands, where n is the number of bits in said corresponding bit cluster.

6. The method of claim 4, wherein:

said hard-modulation gains of the hard-modulation gain pattern take one of a pre-defined high gain value or a pre-defined low gain value, wherein the high gain value is a value that is larger or equal to 1.0, and the low gain value is a value that is lower than or equal to 0.1; and said hard-modulation gains of the hard-modulation gain pattern, which are either said high gain value or said low gain value, are pre-defined values which do not depend on properties or characteristics of their corresponding band signals, and said hard-modulation gain pattern includes at least one said high gain value and at least one said low gain value, and applying said hard-modulation gain pattern to the bands of said band cluster is unconditional and does not depend on the characteristics of said band signals of said bands comprising said band cluster.

7. The method of claim 1, wherein recombining said non-transient frames, any non-watermarked transient frames, and said at least one watermarked transient frame according to said unique sequential time stamps of said time overlapping frames is done by an overlap-and-add process.

8. The method of claim 1, wherein determining which of said transient frames are watermarked transient frames by determining if at least one of said frequency bands has a signal magnitude below said pre-computed detection threshold for said plurality of frequency bands on that frame, thus determining at least one watermarked transient frame further comprises:

determining the maximal (peak) magnitude value of magnitudes of the signal bands comprising the frequency band cluster, thereby defining a computed peak magnitude value;

dividing said computed peak magnitude value by a predefined detection factor larger than 10 to compute the detection threshold;

comparing a signal magnitude of each signal band of the frequency band cluster to the computed detection threshold; and classifying the frame as a watermarked transient frame if at least one signal magnitude of at least one signal band of the frequency band cluster is lower than the computed detection threshold, or classifying the frame as a not watermarked transient frame if no signal magnitude lower than the detection threshold is present.

9. The method of claim 1, wherein for at least one watermarked transient frame, extracting at least one binary gain pattern by determining, for said plurality of frequency bands, which of said frequency bands has a signal magnitude below said pre-computed extraction threshold for said plurality of frequency bands on that frame, and using said at least one binary gain pattern to determine said binary encoded watermark further comprises:

computing a binary form of each hard-modulation gain pattern of the gain pattern cluster to obtain a set of binary gain patterns, wherein the binary gain pattern is computed from the hard-modulation gain pattern by setting the binary gain value of the binary gain pattern to 1 if a corresponding hard-modulation gain of the hard-modulation gain pattern is equal to said high gain, or 0 otherwise;

determining the maximal (peak) magnitude value of magnitudes of the signal bands comprising the frequency band cluster;

dividing a computed peak magnitude value by a predefined extraction factor larger than 10 to compute the extraction threshold;

determining binary values of a binary candidate gain pattern, thus creating a determined binary candidate gain pattern, by comparing said band signal magnitudes of the signal bands comprising the frequency band cluster to the extraction threshold, wherein the determination of each binary value is done by setting the value to: 1 if a corresponding signal magnitude of a corresponding signal band is higher than the extraction threshold, and to 0 if said corresponding signal magnitude of said corresponding signal band is lower than the extraction threshold;

finding a resulting binary gain pattern that is equal to said determined binary candidate gain pattern by comparing said binary candidate gain pattern to each binary gain pattern of the plurality of said binary gain patterns;

if said resulting binary gain pattern is found, determining a character associated with the hard-modulation gain pattern that corresponds to the found resulting binary gain pattern, thus creating a determined character, and using said determined character to derive at least a portion of said binary encoded watermark.

10. A transient acoustic watermark method, said method comprising:

encoding at least one binary encoded watermark into an audio signal by using at least one computer processor to perform the steps of:

segmenting said audio signal into a plurality of time overlapping frames, each frame having a unique sequential time stamp;

using a transient detector to determine which said frames are transient frames comprising transient audio signals, and which of said frames are non-transient frames;

decomposing at least some of said transient frames into a plurality of frequency bands;

encoding at least one binary encoded watermark into at least one transient frame by hard-modulating the signal magnitudes of said plurality of frequency bands according to said at least one binary encoded watermark, thereby creating at least one watermarked transient frame; and creating a transient watermarked audio signal by recombining said non-transient frames, any non-watermarked transient frames, and said at least one watermarked transient frame according to said unique sequential time stamps of said time overlapping frames.

11. The method of claim 10, wherein said plurality of time overlapping frames comprise frames of equal time lengths wherein each subsequent signal frame at least partially overlaps in time with its proceeding frame, said time overlap being at least 50% of said time length.

12. The method of claim 10, wherein said transient frames comprise frames characterized by at least one of an abrupt increase of time-domain signal amplitude envelope, or an abrupt increase of signal spectral energy, or an abrupt increase of zero-crossing rate, or an abrupt increase of spectral flatness, or an abrupt decrease of harmonicity;

and wherein said transient detector determines said transient frames by measuring and tracking at least one of time-domain amplitude envelope values, spectral-domain signal energy values, zero-crossing rate values, spectral flatness values, or harmonicity values on both a given frame and its preceding frame, thereby producing tracked values;

and when a change of said tracked value over at least the time difference between said given frame and its preceding frame exceeds a preset criterion, then determining that said frame is any of a transient or non-transient frame.

13. The method of claim 10, wherein encoding at least one binary encoded watermark onto at least one transient frame by hard-modulating the signal magnitudes of said plurality of frequency bands according to said at least one binary encoded watermark, thereby creating at least one watermarked transient frame, further comprises:

selecting, using at least one processor, a plurality of bit positions in a binary encoded watermark to produce a bit cluster, defining a character representing a set of bit values of the bits at positions comprising the bit cluster, and producing a character cluster representing a set of characters in which each character represents a specific set of bit values of bits of the bit cluster, wherein there is a character for each possible set of bit values of the bits comprising the bit cluster, selecting a subset of bands from the plurality of the frequency bands to produce a frequency band cluster, defining a hard-modulation gain pattern representing a set of hard-modulation gain values for those bands comprising said frequency band cluster, and producing a gain pattern cluster representing a set of the hard-modulation gain patterns in which each hard-modulation gain pattern represents a specific set of hard-modulation gain values of bands of the band cluster, associating each unique character from the character cluster with a unique hard-modulation gain pattern from the gain pattern cluster, determining the character of the character cluster, which corresponds to those bit values contained at corresponding bit positions of the binary encoded watermark, determining the hard-modulation gain pattern of the gain pattern cluster which corresponds to said determined character, applying said determined hard-modulation gain pattern to those bands comprising said band cluster by multiplying those band signals of the bands comprising said band cluster by corresponding hard-modulation gains of said determined hard-modulation gain pattern, synthesizing a time-domain watermarked transient frame from the plurality of the band signals of the transient frame, including both modified band signals of the band cluster and the remaining unmodified bands, thereby producing said at least one watermarked transient frame.

14. The method of claim 13, wherein said band cluster comprises at least n+1 bands, where n is the number of bits in said corresponding bit cluster.

15. The method of claim 13, wherein:

said hard-modulation gains of the hard-modulation gain pattern take one of a pre-defined high gain value or a pre-defined low gain value, wherein the high gain value is a value that is larger or equal to 1.0, and the low gain value is a value that is lower than or equal to 0.1; and said hard-modulation gains of the hard-modulation gain pattern, which are either said high gain value or said low gain value, are pre-defined values which do not depend on properties or characteristics of their corresponding band signals, and said hard-modulation gain pattern includes at least one said high gain value and at least one said low gain value, and applying said hard-modulation gain pattern to the bands of said band cluster is unconditional and does not depend on the characteristics of said band signals of said bands comprising said band cluster.

16. The method of claim 13, wherein recombining said non-transient frames, any non-watermarked transient frames, and said at least one watermarked transient frame according to said unique sequential time stamps of said time overlapping frames is done by an overlap-and-add process.

* * * * *